(12) United States Patent
Kishigami et al.

(10) Patent No.: US 8,098,616 B2
(45) Date of Patent: Jan. 17, 2012

(54) RADIO COMMUNICATION SYSTEM, RADIO COMMUNICATION METHOD, AND RADIO COMMUNICATION DEVICE

(75) Inventors: Takaaki Kishigami, Ota-ku (JP); Yoichi Nakagawa, Ota-ku (JP)

(73) Assignee: Panasonic Corporation, Osaka (JP)

( * ) Notice: Subject to any disclaimer, the term of this patent is extended or adjusted under 35 U.S.C. 154(b) by 1184 days.

(21) Appl. No.: 10/524,803

(22) PCT Filed: Dec. 5, 2003

(86) PCT No.: PCT/JP03/15605
§ 371 (c)(1),
(2), (4) Date: Feb. 16, 2005

(87) PCT Pub. No.: WO2004/051903
PCT Pub. Date: Jun. 17, 2004

(65) Prior Publication Data
US 2005/0265470 A1      Dec. 1, 2005

(30) Foreign Application Priority Data

Dec. 5, 2002  (JP) ................................. 2002-354103
Dec. 1, 2003  (JP) ................................. 2003-401269

(51) Int. Cl.
*H04J 11/00*   (2006.01)
*H04B 7/204*  (2006.01)
*H04B 7/216*  (2006.01)
*H04B 7/208*  (2006.01)
*H04B 7/212*  (2006.01)
*H04W 4/00*   (2009.01)

(52) U.S. Cl. ........ 370/319; 370/203; 370/334; 370/335; 370/344; 370/347

(58) Field of Classification Search .................. 370/334, 370/335, 319, 344, 347, 346, 203
See application file for complete search history.

(56) References Cited

U.S. PATENT DOCUMENTS
6,144,711 A * 11/2000 Raleigh et al. ................ 375/347
(Continued)

FOREIGN PATENT DOCUMENTS
EP           03 77 7295          6/2011
(Continued)

OTHER PUBLICATIONS

Takeo Ohgane, et al., "A Study on a Channel Allocation Scheme With an Adaptive Array in SDMA", IEEE $47^{th}$ VTC, pp. 725-729 vol. 2 1997.

(Continued)

*Primary Examiner* — Daniel J Ryman
*Assistant Examiner* — Thinh Tran
(74) *Attorney, Agent, or Firm* — RatnerPrestia

(57) ABSTRACT

In the environment of a communication area including a SDM-compatible mobile station for space division multiplex transmission and a SDM-uncompatible mobile station not compatible with space division multiplex transmission, a base station having a plurality of antennas and capable of adaptively changing directivity performs allocation of a mobile station which simultaneously performs space division multiplex transmission (SDM) and space division multiplex access (SDMA) by using a predetermined space division multiplex transmission evaluation criterion and a space division multi access evaluation criterion. By using this radio communication method, it is possible to use the spatial degree of freedom at its maximum and provide a radio communication system having an improved communication capacity.

6 Claims, 8 Drawing Sheets

U.S. PATENT DOCUMENTS

| | | | |
|---|---|---|---|
| 6,359,923 B1 | 3/2002 | Agee et al. | |
| 6,466,557 B1 | 10/2002 | Doi | 370/332 |
| 6,937,592 B1 * | 8/2005 | Heath et al. | 370/342 |
| 7,110,378 B2 * | 9/2006 | Onggosanusi et al. | 370/334 |
| 2001/0047424 A1 * | 11/2001 | Alastalo et al. | 709/236 |
| 2002/0051430 A1 | 5/2002 | Kasami et al. | 370/319 |
| 2002/0051436 A1 | 5/2002 | Ertel et al. | |
| 2002/0057660 A1 | 5/2002 | Park et al. | |
| 2002/0126650 A1 * | 9/2002 | Hall et al. | 370/349 |
| 2002/0193146 A1 * | 12/2002 | Wallace et al. | 455/562 |
| 2003/0123565 A1 | 7/2003 | Fukuda et al. | 375/267 |
| 2003/0128658 A1 * | 7/2003 | Walton et al. | 370/208 |

FOREIGN PATENT DOCUMENTS

| | | |
|---|---|---|
| GB | 2 341 757 A | 3/2000 |
| JP | 2002-198933 A | 7/2002 |
| JP | 2002-261670 A | 9/2002 |
| JP | 2003-249882 A | 9/2003 |
| WO | WO 01/63779 A2 | 8/2001 |

OTHER PUBLICATIONS

Gerard J. Foschini, "Layered Space-Time Architecture for Wireless Communiction in a Fading Environment When Using Multi-Element Antennas", Bell Labs Tech., J, pp. 41-59, Autumn 1996.

International Search Report for PCT/JP03/15605, dated Mar. 23, 2004.

Quentin H. Spencer, et al., "An Introduction to the Multi-User MIMO Downlink," IEEE Communications Magazine, Oct. 2004, pp. 60-67.

Quentin H. Spencer, et al., "Zero-Forcing Methods for Downlink Spatial Multiplexing in Multiuser MIMO Channels," IEEE Transactions on Signal Processing, vol. 52, No. 2, Feb. 2004, pp. 461-471.

* cited by examiner

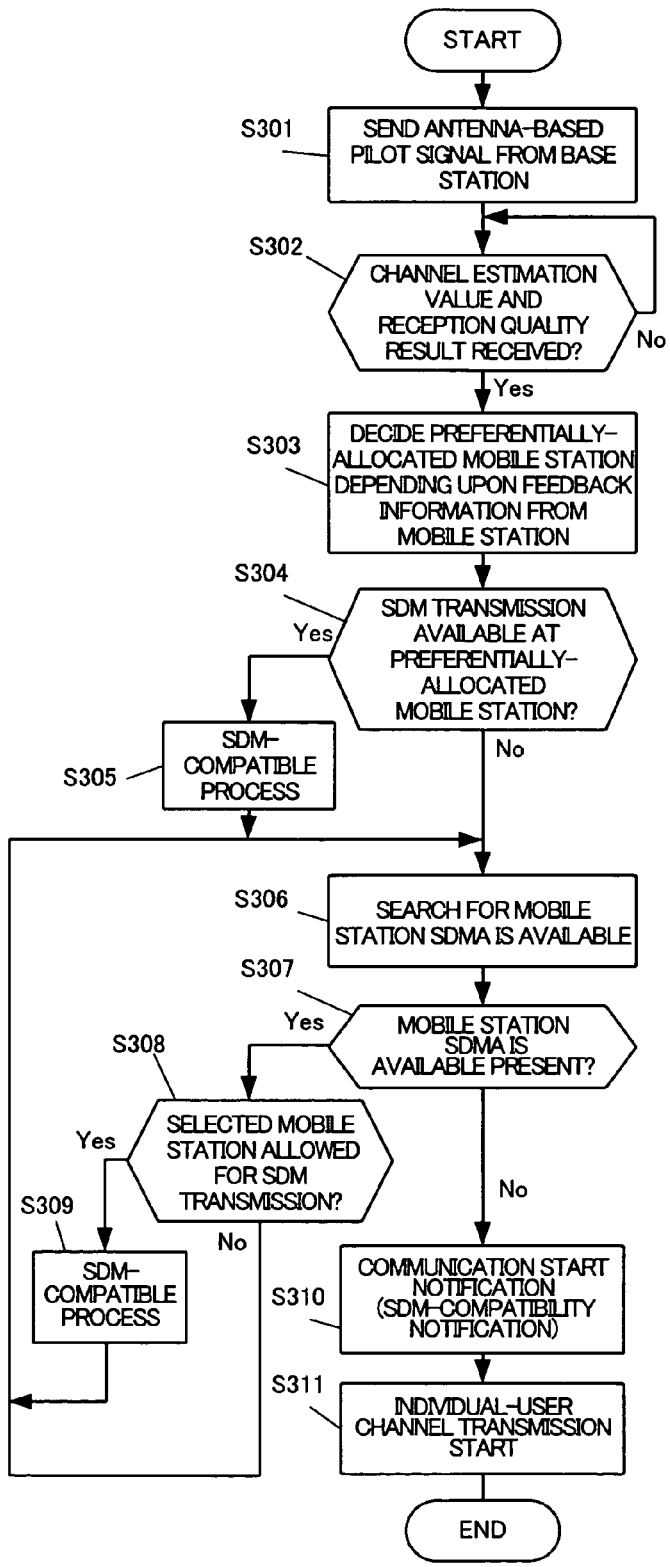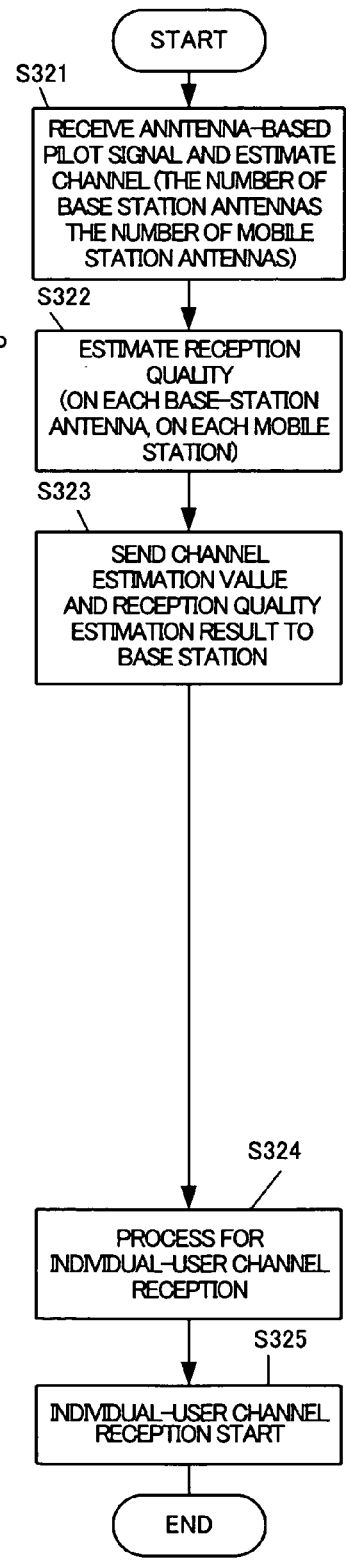

RADIO COMMUNICATION SYSTEM, RADIO COMMUNICATION METHOD, AND RADIO COMMUNICATION DEVICE

This application is a U.S. National Phase Application of PCT International Application PCT/JP2003/015605.

TECHNICAL FIELD

The present invention relates to a radio communication system using space division multiple access and space division multiplex, and more particularly to a radio communication system, radio communication method and apparatus for same, adapted to determine the applicability of and apply both simultaneously or any one of space division multiple access and space division multiplex transmission in accordance with propagation environment, traffic status and the like where there are coexisting mobile stations compatible with space division multiplex transmission and mobile stations uncompatible therewith, within a communication area.

BACKGROUND ART

Recently, there is an increasing demand toward the increase in the capacity and speed of radio communication. Studies are vigorous as to the methods for improving the effective utilization ratio of definite frequency resources, as one method of which attentions are drawn to the technique to make use of space domains. The space-domain utilization techniques includes, as one, an adaptive array antenna (adaptive antenna) wherein, by adjusting the amplitude and phase by means of a weighting coefficient for multiplication on a received signal (hereinafter, referred to as "weight"), reception is intense for the signals arriving in a desired direction, thus enabling suppression in directions of interference waves. This can improve the communication capacity for the system.

Meanwhile, there are other arts utilizing space domains, i.e. 1) space division multiple access technique for transmission to different mobile stations (hereinafter, referred to as "SDMA" wherein SDMA is an abbreviation of space division multiple access) and 2) space division multiplex technique for transmission to the same mobile station (hereinafter, referred to as "SDM" wherein SDM is an abbreviation of space division multiplex), of different data sequences by use of the physical channels same in time, frequency and sign through utilization of a spatial orthogonality over the propagation path. The SDMA technique is disclosed of information in JP-A-2002-261670 and in Document T. Ohgane et al, "A study on a channel allocation scheme with an adaptive array in SDMA," (IEEE 47th VTC, Page(s): 725-729 vol. 2 1997). Where the spatial correlation coefficient between mobile stations is lower than a predetermined value, SDMA is available thus making it possible to improve the throughput of a radio communication system and the number of simultaneous active users.

Meanwhile, the SDM technique is disclosed of information in JP-T-2001-505723 and in Document G. J. Foschini, "Layered space-time architecture for wireless communication in a fading environment when using multi-element antennas," (Bell Labs Tech. J, pp. 41-59, Autumn 1996), wherein the transmitter and the receiver both has a plurality of antenna elements thus realizing SDM transmission under the propagation environment low in received signal correlation between the antennas. In this case, different data sequences are sent from a plurality of antennas provided on the transmitter by use of physical channels same in time, frequency and sign on an antenna-element-by-antenna-element basis. At the receiver, demultiplex-reception is made based on different data sequence from the received signal at a plurality of antennas provided on the receiver. This allows to achieve speed increase by use of a plurality of space division multiplex channels instead of using multi-level modulation. In implementing SDM transmission, communication capacity can be increased in proportion to the number of antennas on condition that the transmitter and the receiver have the equal number of antennas, in an environment that a multiplicity of scatterers exist between the transmitter and the receiver under satisfactory S/N (signal-to-noise ratio) conditions.

However, in the conventional SDM art, the maximum number of space division multiplex ones undergoes restriction at the end of transmitter and receiver which is less in the number of antennas. Consequently, where there is a deviation in the number of transmission and receive antennas, space division multiplex is possibly not utilized efficiently under certain propagation environments. Particularly, because antenna elements can be set up greater in the number at the base station end than at the mobile station, there arises a case to cause a room for the degree of spatial freedom in transmission of from the base station to the mobile station. Meanwhile, in order to make the mobile station compatible with SDM, there is a need for a plurality of antennas, a plurality of transmission or reception systems and a signal processing section for demultiplexing a space-division-multiplexed signal, thus raising cost. For this reason, it can be considered that the mobile stations not compatible with SDM coexist within the communication area, thus requiring a method for space division multiple access under coexistence of mobile stations compatible with space division multiplex and mobile stations uncompatible therewith. Meanwhile, SDMA, when to implement, usually employs space division based on directive beams. In case SDM is done furthermore, beam-to-beam spatial correlation is increased resulting in a propagation condition not suited for SDM in general cases.

DISCLOSURE OF THE INVENTION

A radio communication system of the present invention is characterized to implement space division multiplex transmission and space division multiple access by use of a predetermined space division multiplex transmission evaluation criterion and space-division-multiple-access evaluation criterion in an environment that there are coexisting a base station having a plurality of antennas and capable of adaptively changing the directionality, space-division-multiplex compatible mobile stations that are compatible with space division multiplex transmission and space-division-multiplex uncompatible mobile stations that are uncompatible with space division multiplex transmission, within a communication area.

Meanwhile, a radio communication system of the invention comprises: a space-division-multiplex compatible mobile station compatible with space division multiplex transmission; a space-division-multiplex uncompatible mobile station uncompatible with space division multiplex transmission; and a base station including partial-space orthogonalizing means for making a weighting process, for enhancing orthogonality over a propagation path for the space division multiplex transmission, on a transmission data sequence to be sent by space division multiplex to the space-division-multiplex compatible mobile station allocated for space division multiplex transmission within a communication area, a beam forming section for forming a transmission beam to the space-division-multiplex compatible mobile station and the space-division-multiple-access mobile station, responsive to a transmission data sequence to the space-division-multiple-access mobile station allocated for space division multiple access within a communication area and to an output of the partial-space orthogonizing means, the transmission beam being to reduce an interference with another mobile station to access simultaneously, and a plurality of antennas for transmitting the transmission beam.

Meanwhile, forming the transmission beam for reducing an interference by the beam forming section of the base station apparatus in the radio communication system of the invention is to form the transmission beam from the transmission data sequence to the allocated space-division-multiple-access mobile station and an output of the partial-space orthogonalizing means in a manner being orthogonal to a channel estimation matrix on another mobile station to access simultaneously.

This allows for implementing space division multiplex transmission and space division multiple access at the same time and for selecting a mobile station with which multiplexing is available with use of a space domain, hence having a function to efficiently make use of space division multiplex.

A radio communication method of the invention comprises: a step for allowing a base station apparatus to calculate a space division multiplex transmission evaluation criterion and space-division-multiple-access evaluation criterion, on a basis of a channel estimation matrix and received quality for a space-division-multiplex compatible mobile station and space-division-multiplex uncompatible mobile station; a step for allowing the base station apparatus to allocate the space-division-multiplex compatible mobile station to space division multiplex transmission by the space division multiplex transmission evaluation criterion and make a weighting process for an enhancement of orthogonality over a propagation path for the space division multiplex transmission, on a transmission data sequence to be sent by space division multiplex to the allocated space-division-multiplex compatible mobile station; and a step for allowing the base station apparatus to assign the space-division-multiplex compatible mobile station and space-division-multiplex uncompatible mobile station to space division multiple access by the space-division-multiple-access evaluation criterion, and form a transmission beam to the space-division-multiplex compatible mobile station and space-division-multiple-access mobile station responsive to a transmission data sequence to the allocated space-division-multiple-access mobile station and the transmission data sequence weighting-processed and to be sent by space division multiplex, the transmission beam being to reduce an interference with another mobile station to access simultaneously, thus sending same from the base-station antenna.

Meanwhile, a radio communication method according to the invention further comprises a step for allowing the base station apparatus to send known signals on each of antennas provided in a number of N, a step for allowing the space-division-multiplex compatible mobile station and space-division-multiplex uncompatible mobile station to measure, on each of antennas provided in a total number of M, a channel estimation matrix constituted by channel estimation values in a number of N×M by use of a received result of the known signals in a number of N, and further to measure a received quality, and a step for allowing the space-division-multiplex compatible mobile station and space-division-multiplex uncompatible mobile station to send the channel estimation matrix and received quality to the base-station apparatus through a communication line, wherein, forming the transmission beam for reducing an interference by the base station apparatus is to form the transmission beam from a transmission data sequence to the space-division-multiple-access mobile station allocated and a transmission data sequence weight-processed and to be sent by space division multiplex, in a manner being orthogonal to a channel estimation matrix on another mobile station to access simultaneously.

This enables to decide the applicability of space division multiplex transmission and space division multiple access, depending upon a channel estimation value and received quality information.

Meanwhile, a radio communication method according to the invention is characterized in that the known signal is to be sent by time division multiplex on an antenna-by-antenna basis by use of different code sequences from base-station antennas in the number of N, thus having a function to measure at the base station a channel estimation value on each of the base-station antennas.

Meanwhile, a radio communication method according to the invention is characterized in that the known signal is sent by code division multiplex on an antenna-by-antenna basis by use of different code sequences from base-station antennas in the number of N, thus having a function to measure at the base station a channel estimation value on each of the base-station antennas.

Meanwhile, a radio communication method according to the invention is characterized in that the known signal is to be sent by a combination of time division multiplex and code division multiplex on an antenna-by-antenna basis by use of different code sequences from base-station antennas in the number of N, thus having a function to measure at the base station a channel estimation value on each of the base-station antennas.

Meanwhile, a radio communication method of the invention comprises: a step for allowing the space-division-multiplex compatible mobile station and space-division-multiplex uncompatible mobile station to send known signals to a base station at each of antennas provided thereon in a total number of M; a step for allowing the base station to receive at each of a plurality N of base-station antennas and measure a channel estimation matrix constituted by channel estimation values in a number of N×M depending upon the known signal, and further to measure a received quality; a step for allowing the base station to calculate a space division multiplex transmission estimating criterion and space-division-multiple-access estimating criterion depending upon the channel estimation matrix and the received quality; a step for allowing the base station apparatus to allocate the space-division-multiplex compatible mobile station to space division multiplex transmission by the space division multiplex transmission evaluation criterion and make a weighting process for an enhancement of orthogonality, over a propagation path for the space division multiplex transmission, on a transmission data sequence to be sent by space division multiplex to the allocated space-division-multiplex compatible mobile station; and a step for allowing the base station to allocate the space-division-multiplex compatible mobile station and space-division-multiplex uncompatible mobile station to space division multiple access by the space-division-multiple-access evaluation criterion, and form a transmission beam to the space-division-multiplex compatible mobile station and space-division-multiple-access mobile station responsive to a transmission data sequence to the allocated space-division-multiple-access mobile station and the transmission data sequence weighting-processed and to be sent by space division multiplex, the transmission beam being to reduce an interference with another mobile station to access simultaneously, thus transmitting the transmission beam from the base-station antenna. This enables the decision for applicability of space division multiplex transmission and space division multiple access, depending upon a channel estimation value and received quality information.

Meanwhile, forming the transmission beam for reducing an interference by the base station in a radio communication method according to the invention is to form the transmission beam from a transmission data sequence to the allocated space-division-multiple-access mobile station and a transmission data sequence weight-processed and to be sent by space division multiplex, in a manner being orthogonal to a channel estimation matrix on another mobile station to access simultaneously.

Meanwhile, a radio communication method according to the invention is characterized in that the received quality uses any of received-signal-power-to-noise-power ratio, received-signal-power-to-interference-power ratio and received power. This provides a function to grasp a received quality of in the mobile station.

Meanwhile, a radio communication method according to the invention is characterized in that the received quality uses received-signal-power-to-noise-power ratio, and any one of moving speed of the mobile station and fading frequency estimation value, thus enabling to decide the applicability of space division multiplex transmission and space division multiple access in accordance with a roaming status of the mobile station.

Meanwhile, a radio communication method according to the invention is characterized in that the step of calculating a space division multiplex transmission estimating criterion comprises a step of selecting a space-division-multiplex compatible mobile station satisfying a predetermined received quality, and a step of deciding a space division multiplex transmission count depending upon a space correlation coefficient of between channel estimation values in a number of N obtained between different antennas on the space-division-multiplex compatible mobile station of among selected ones of the space-division-multiplex compatible mobile stations, thus enabling to decide the applicability of space division multiplex transmission and space division multiple access in accordance with a propagation environment of the mobile station.

Meanwhile, a radio communication method according to the invention is characterized in that the base station embeds previously a known signal in a data sequence to be sent on a transmission beam to the space-division-multiplex compatible mobile station or the space-division-multiplex uncompatible mobile station that is space-division-multiple accessed, and the space-division-multiplex compatible mobile station space-division-multiple accessed calculates a channel estimation value depending upon the known signal and makes demultiplex-receiving of a signal sent by space division multiplex depending upon the channel estimation value, thus having a function to demultiplex-receive at the mobile station a plurality space-division-multiplex-transmission signals space-division-multiplex-transmitted.

Meanwhile, a radio communication method according to the invention is characterized in that the step of calculating a space-division-multiple-access evaluation criterion comprises a step of allocating the mobile station, with priority, by predetermined scheduling means, a step of selecting a space-division-multiplex compatible mobile station or space-division-multiplex uncompatible mobile station satisfying a predetermined received quality from the others than the mobile station allocated with priority, and a step of selecting a mobile station having an antenna minimal in a space correlation coefficient to a channel estimation matrix obtained at an antenna of the mobile station allocated with priority from among selected ones of the space-division-multiplex compatible mobile stations or space-division-multiplex uncompatible mobile stations, thus having a function to select a mobile station with which space division multiple access is available with a predetermined communication quality.

Meanwhile, a radio communication method according to the invention is characterized in that the transmission beam for space division multiple access or space division multiplex transmission is placed under power control into a predetermined communication quality. This provides a function to enable communication at between the base station and the mobile station with a predetermined communication quality.

Meanwhile, a radio communication method according to the invention is characterized in that power control is made to set a communication quality of from the base station apparatus to the space-division-multiplex uncompatible mobile station higher than a communication quality of from the base station apparatus to the space-division-multiplex compatible mobile station. This provides a function to enhance, with priority, the received quality at the space-division-multiplex uncompatible mobile station low in interference suppression performance, and thereby to compensate for it.

Meanwhile, a radio communication method according to the invention is characterized in that the space-division-multiple-access evaluation criterion is to give priority to a multiple access of between the space-division-multiplex uncompatible mobile stations in the case that call loss is greater than a predetermined value. This can increase the number of mobile stations with which simultaneous connections are available by giving priority to space division multiple access, thus having a function to suppress call loss.

A base station apparatus of the invention comprises: a partial-space orthogonalizing means for making a weighting process, for enhancing orthogonality over a propagation path for the space division multiplex transmission, on a transmission data sequence to be sent by space division multiplex to the space-division-multiplex compatible mobile station allocated for space division multiplex transmission within a communication area; a beam forming section for forming a transmission beam to the mobile station responsive to a transmission data sequence to the space-division-multiple-access mobile station allocated for space division multiple access within a communication area and an output of the partial-space orthogonizing means, the transmission beam to the mobile station being to reduce an interference with another mobile station to access simultaneously; and a plurality of antennas for transmitting the transmission beam.

Meanwhile, a base station apparatus according to the invention is characterized in that forming the transmission beam for reducing an interference by the beam forming section is to form the transmission beam from the transmission data sequence to the allocated space-division-multiple-access mobile station and the output of the partial-space orthogonizing means, in a manner being orthogonal to a channel estimation matrix on another mobile station to access simultaneously. This provides a function to form a transmission beam to which space division multiplex transmission and space division multiple access are to be applied simultaneously.

Meanwhile, in the weighting process in the beam forming section of the base station apparatus of the invention, in a case that the space-division-multiplex compatible mobile station and the space-division-multiplex uncompatible mobile station are allocated for space division multiple access at a same time, the beam forming section makes, for the space-division-multiplex uncompatible mobile station, a maximum ratio synthetic beam as a transmission beam to the space-division-multiplex uncompatible mobile station and, for the spacedivision-multiplex compatible mobile station, a transmission beam as a beam for reducing an interference with another of the space-division-multiplex uncompatible mobile station and space-division-multiplex compatible mobile station to access simultaneously, whereby transmission is made possible that the received quality at the space division multiplex compatible mobile station not having a spatial interference suppression ability is enhanced with priority rather than the space-division multiplex mobile station.

Meanwhile, forming the transmission beam for reducing an interference by the beam forming section of the base station apparatus of the invention is to form the transmission beam orthogonal to a channel estimation matrix on another of the space-division-multiplex uncompatible mobile station and space-division-multiplex compatible mobile station to access simultaneously.

Meanwhile, a base station apparatus according to the invention further comprises space-time coding means for making a space-time coding process on a transmission data sequence to the space-division-multiplex compatible mobile station, the transmission data sequence space-time coded being outputted to the partial-space orthogonizing means. This can improve the received quality due to addition of the error correction ability added with a transmission diversity effect despite transmission rate lowers.

Meanwhile, a base station apparatus according to the invention further comprises a deciding section for allocating the space-division-multiple-access mobile station and the space-division-multiplex mobile station by use of a predetermined space division multiplex transmission evaluation criterion and space-division-multiple-access evaluation criterion. This enables to decide the applicability of space division multiplex transmission and space division multiple access.

Meanwhile, a base station apparatus according to the invention is characterized in that the space division multiplex transmission evaluation criterion and the space-division-multiple-access evaluation criterion are to be calculated depending upon a channel estimation value and received quality received from the mobile station of within the communication area. This enables to decide the applicability of space division multiplex transmission and space division multiple access, depending upon a channel estimation value and received quality information.

Meanwhile, a base station apparatus according to the invention is characterized in that, in a case that the space-division-multiple-access mobile stations include a space-division-multiplex compatible mobile station and a space-division-multiplex uncompatible mobile station, a transmission beam to the space-division-multiplex uncompatible mobile station is formed by use of a complex-conjugate-transposition of a channel estimation matrix on the space-division-multiplex uncompatible mobile station, and a transmission beam to the space-division-multiplex compatible mobile station is formed in a manner being orthogonal to a channel estimation matrix on another space-division-multiple-access mobile stations to access simultaneously. This enables the space-division-multiplex uncompatible mobile station to gain a received signal that a plurality of transmission signals from a plurality of antennas of the base station are synthesized in maximal ratio.

As described above, according to the present invention, there is provided a radio communication system allowed for space division multiplex transmission to particular mobile stations as well as space division multiple access to other mobile stations in a radio communication system having a base station having a plurality of antennas, thus efficiently utilizing the spatial freedom at the base station and improving the communication capacity over the radio communication system.

Meanwhile, by providing a control method for adaptively changing the space division multiplex method (SDM, SDMA) depending upon a traffic status, etc. of within a communication area, communication capacity is improved for the radio communication system through the effective utilization of SDM- or SDMA-based space division multiplex technique and user diversity effect.

BRIEF DESCRIPTION OF THE DRAWINGS

FIG. 3A is a flowchart showing a mobile-station allocation process procedure at the base station in embodiment 1 of the invention.

FIG. 3B is a flowchart showing a allocation process procedure at the mobile station end in embodiment 1 of the invention.

BEST MODE FOR CARRYING OUT THE INVENTION

Now an embodiment of the present invention will be explained with the use of FIGS. 1 to 8.

Embodiment 1

Figure 1:
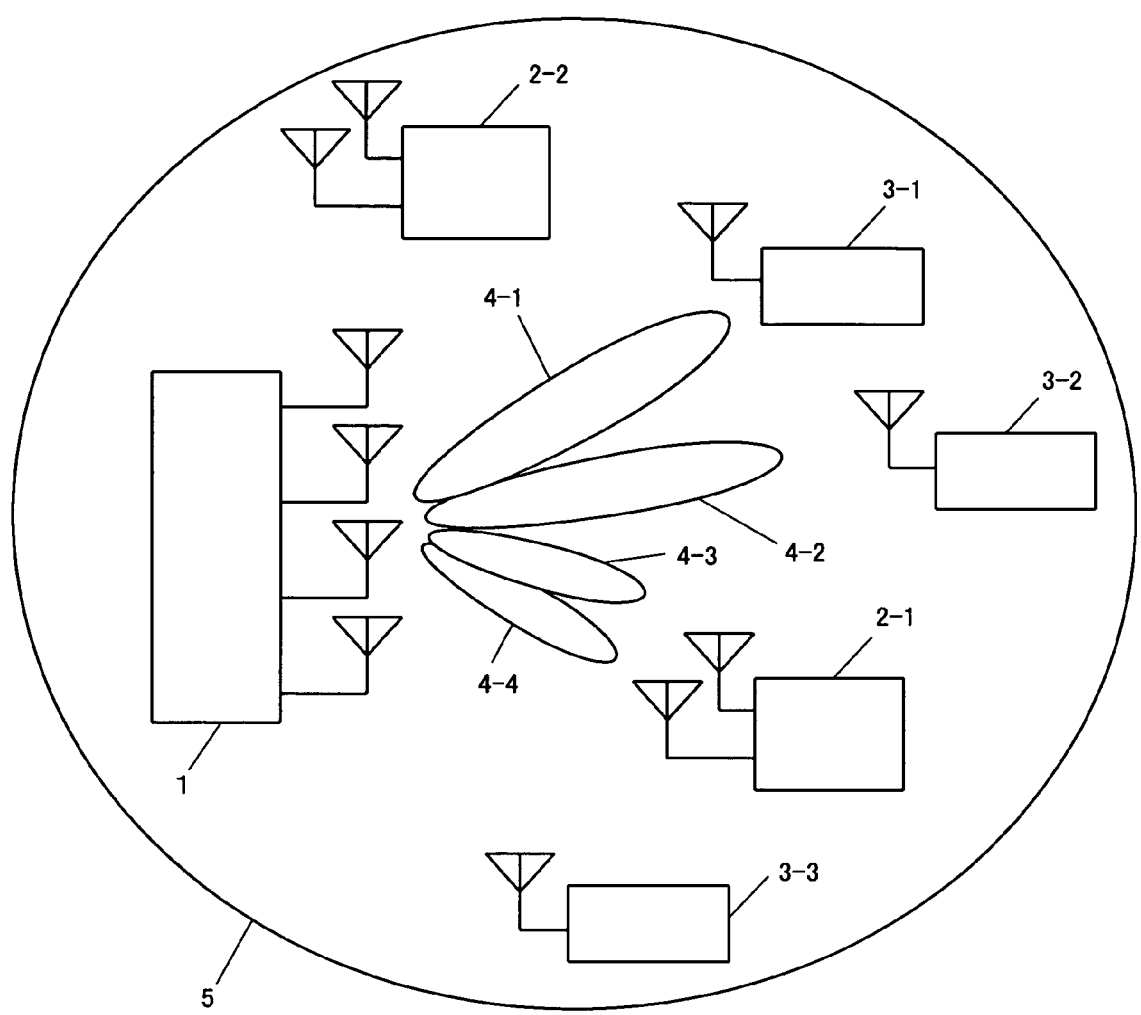
FIG. 1 is a figure showing an arrangement of a radio communication system in embodiment 1 of the present invention.

FIG. 1 is a figure showing the outline of a radio communication system according to embodiment 1 of the invention. Explained hereunder is a method of communication using a space division multiplex in a transmission of from a base station to a mobile station (hereinafter, referred to as "downlink").

In FIG. 1, a base station 1 has a plurality of antenna elements to adaptively vary the directivity of the antennas. SDM-compatible mobile stations 2-1-2 are a plurality of mobile stations compatible with space division multiplex while SDM-uncompatible mobile stations 3-1-3 are a plurality of mobile stations uncompatible with SDM transmission. Transmission beams 4-1-4 are a plurality of beams of from the base station 1 to the mobile stations to communicate. A communication area 5 is an area in which the base station 1 is allowed to communicate with the SDM-compatible mobile stations 2 and the SDM-uncompatible mobile stations 3. Incidentally, this is not limitative in respect of the number of SDM-compatible mobile stations 2 and the number of SDM-uncompatible mobile stations 3.

When there are a plurality of communicatable SDM-compatible mobile stations 2 and SDM-uncompatible mobile stations 3 coexisting within the communication area 5, the radio communication system of the invention is allowed to make any one of or both simultaneously of a space division multiple access to between different mobile stations and a space division multiplex to the same one of the mobile stations. Thus, space division multiplex is made feasible with efficiency. Note that the SDM-compatible mobile stations 2, or including SDM-uncompatible mobile stations 3, are hereinafter expressed as mobile stations $MS_m$ with numbering. Incidentally, m takes a natural number equal to or smaller than the number of mobile stations $N_{ms}$ within the communication area 5. The base station 1 is to decide, from a multiplicity of SDM-compatible mobile stations 2 and SDM-uncompatible mobile stations 3, whether both simultaneously of or any one of SDM and SDMA are available, thus forming a plurality of transmission beams 4 at the base station antenna. This allows the base station 1 to realize space division multiplex and space division multiple access as decided available.

Figure 2:
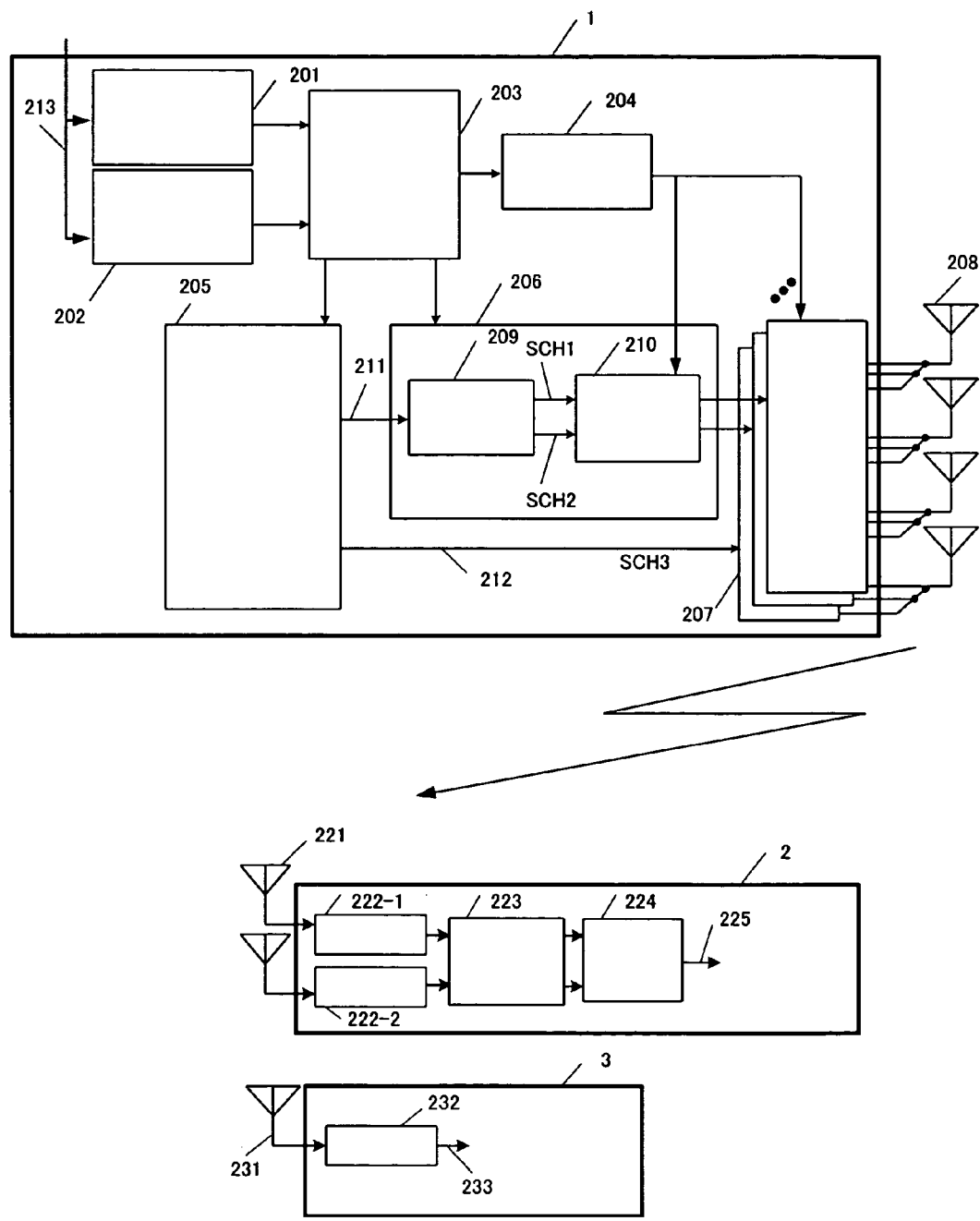
FIG. 2 is a figure showing a configuration of a base station and mobile station in embodiment 1 of the invention.

FIG. 2 shows a detailed configuration of the base station BS and mobile station MS in the radio communication system of the present embodiment. Incidentally, FIG. 2 shows the case to send an individual-user transmission data sequence 211 to the SDM-compatible mobile station $MS_1$ by use of two space division multiplex channels (SCH1, SCH2) as well as an individual-user transmission data sequence 212 to the SDM-uncompatible mobile station $MS_2$ by use of one space division multiplex channel (SCH3). However, this is not limitative.

In the base station BS in FIG. 2, space-division multiplex transmission evaluation criterion calculating means 201 is to calculate an evaluation criterion for deciding whether suited for space division multiplex transmission. Space-division-multiple-access evaluation criterion calculating means 202 is to calculate an evaluation criterion for deciding whether suited for space division multiple access. By use of those evaluation criterion values, deciding means 203 is to decide an allocation of mobile stations to which SDM or SDMA is to be made. Meanwhile, weight generating means 204 is to generate a weight for forming a directivity suited for a propagation path, depending upon an output of the deciding means 203. Space-division-multiple-access control means 205 is to make an output control of a transmission data sequence for a desired mobile station, depending upon an output of the deciding means 203. Here, output control is to be effected, as an example, on the transmission-data sequence 211 to the mobile station $MS_1$ and on the transmission data sequence 212 to a mobile station $MS_2$. Space-division-multiplex transmission control means 16 is to make a control for space division multiplex transmission to a desired mobile station, depending upon an output of the deciding means 203. Here, control is effected, as an example, for space division multiplex on the transmission data sequence 211 to the SDM-compatible mobile station $MS_1$. Meanwhile, space-division-multiplex transmission control means 206 is made by series-parallel converting means 209 for generating, as to one transmission data sequence, a plurality of transmission data sequence commensurate with space division multiplex count, and partial space orthogonalizing means 210 for sending, by spatially orthogonalizing, the transmission data sequence series-parallel-converted (showing a case with two space division multiplex channels (SCH1, SCH2) in the figure).

Meanwhile, beam forming section 207 is to multiply transmission weights $W_1$-$W_3$ respectively on the space division multiplex channels SCH1-SCH3. A base-station antenna 208 is made up by a plurality Nt (Nt>1) of antenna elements. Incidentally, the transmission weight $W_j$ is constituted by a column vector having elements (complex number values) in the number of antenna elements Nt.

Now explanation is made on the configuration of the SDM-compatible mobile station $MS_1$.

A plurality $Ns^{(1)}$ of antennas 221 are provided on the mobile station $MS_1$ to receive a radio-frequency signal sent from the base station BS. A receiver section 222 is to convert the radio-frequency signal into a base-band signal. Space division demultiplex means 223 is to demultiplex-receive a space division multiplex signal out of the base-band signal. Data mixing means 224 is to mix together the signals demultiplex-received, and restore them into the former data sequence transmitted. A received data sequence 225 is to be outputted from the data mixing means 224.

Now explanation is made on the SDM-uncompatible mobile station MS2.

A mobile station antenna 231 is provided on the mobile station $MS_2$ to receive a radio-frequency signal sent from the base station BS. A receiver section 232 is to output an $MS_2$ received data sequence 233 out of the radio-frequency signal.

Now explanation is made on the communicating operation of between the base station 1 and the mobile stations $MS_m$ in the present embodiment. FIG. 3 is a flowchart showing a process procedure for communication allocation to the base station 1 and mobile stations $MS_m$. After establishing a frame synchronization and symbol synchronization, the base station 1 having antenna elements and transmission systems in the number of Nt first sends, from the respective transmissing systems, a known signal sequence (hereinafter, referred to as "antenna-based pilot signals APk(t)") comprising a predetermined symbol number Np (step S301). Note that k is a transmission-system number wherein k=1, 2, ..., Nt. Meanwhile, t=1, ..., Np. Incidentally, where the base station 1 has a sufficiently great number of antenna elements Nt or where the SDM space division multiplex count is limited smaller than the number of antenna elements Nt at the base station 1, there is no need to use all the transmission systems in the number of Nt. Part of them may be used to send antenna-based pilot signals.

Figure 4A:
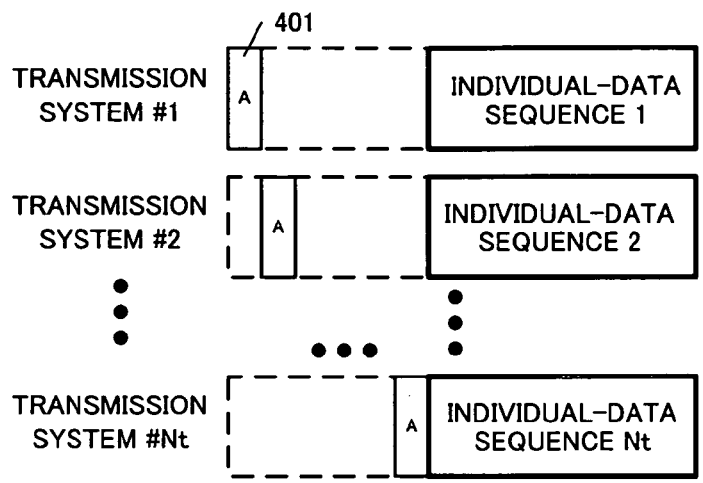
FIG. 4A is a figure showing a frame structure in time division transmission of an antenna-based pilot signal in embodiment 1 of the invention.
Figure 4B:
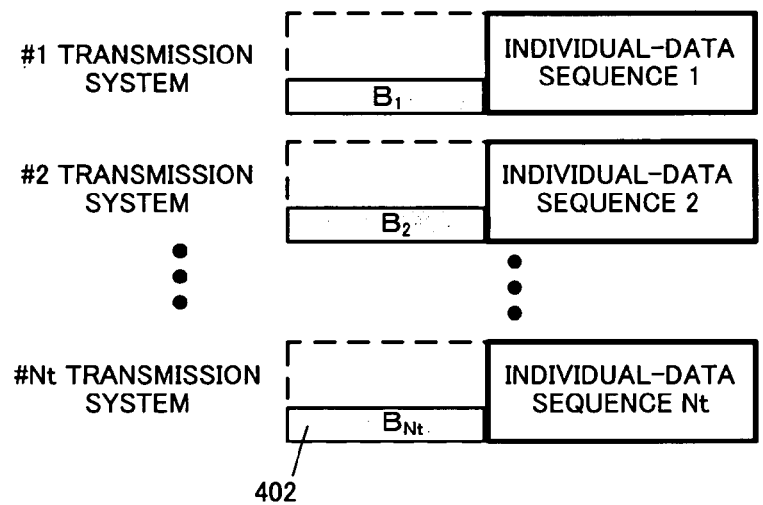
FIG. 4B is a figure showing a frame structure in code division transmission of an antenna-based pilot signal in embodiment 1 of the invention.
Figure 4C:
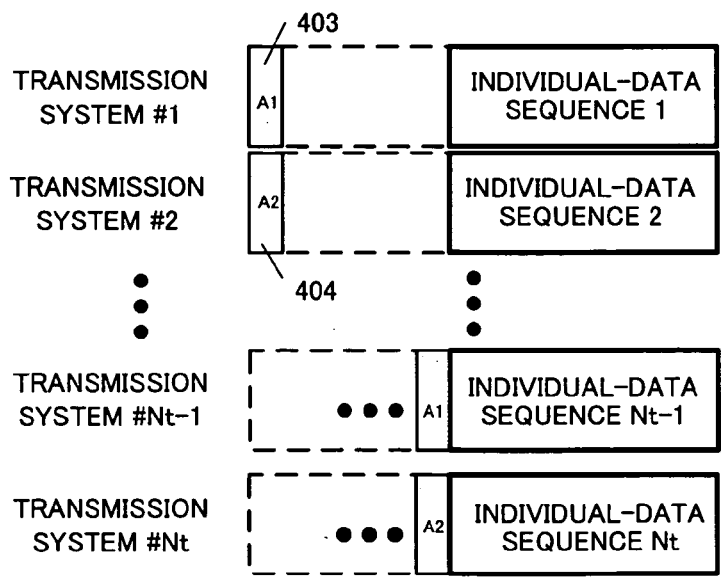
FIG. 4C is a figure showing a frame structure in time/code division transmission of an antenna-based pilot signal in embodiment 1 of the invention.

Here, FIGS. 4A-C are figures showing the transmission timing of antenna-based pilot signals (frame structure). FIG. 4A illustrates time division transmission by a deviation in transmission timing of a known signal sequence A (401) as antenna-based pilot signals, on an antenna-by-antenna basis. Incidentally, there is shown that the antenna-based pilot signals use the same pattern or mutually-orthogonal code sequence based on PN signals, etc. FIG. 4B illustrates code division multiplex transmission at different antennas by use of a known code sequence $B_k$ (402) orthogonal one to another. FIG. 4C illustrates a scheme in combination of time division transmission and code division transmission. Namely, for a certain combination of antennas, time division slots at the same time are shared to send respective antenna-based pilot signals A1 (403), A2 (404) by code division multiplex with the use of code sequences orthogonal one to another. This can reduce the overhead in time division transmission where the number of antennas is great at the base station 1. Meanwhile, it is possible to moderate the reduction in orthogonality over a propagation path during code division multiplex.

Meanwhile, the mobile station $MS_m$ existing within the communication area 5 demultiplex-receives the antenna-based pilot signal $AP_k(t)$ sent on an antenna-by-antenna basis of the base station, and calculates a channel estimation value (step S321). Furthermore, it measures a quality of reception (step S322).

Now explanation is made on the operation at the steps S321 and S322. The m-th mobile station $MS_m$ existing within the communication area 5 has antennas in the number of Ns(m) and reception systems in the number of Ns(m), thus enabling SDM-reception at space division multiplex channels in the number of maximally Ns(m). Note that m is a natural number equal to or smaller than the number of mobile stations $N_{ms}$ present within the communication area 5. Here, Ns(m)=1 is given for the SDM-uncompatible mobile station 3 while Ns(m)>1 is for the SDM-compatible mobile station 2. The mobile station $MS_m$ makes a correlation operation on $r_{j,k}^{(m)}(t)$ (j=1, ..., Ns(m)) as a result of reception of a k-th antenna-based pilot signal $AP_k(t)$ at the j-th antenna and reception system with $AP_k(t)$ generated in the mobile station $MS_m$, and calculates a propagation-path channel estimation value $h^m(j, k)$ as shown in (Equation 1). Incidentally, * is an operator for complex conjugate. Incidentally, the correlation operation may be by saving a received result of antenna-based pilot signals $AP_k(t)$ in a plurality of number of times and making an averaging process over those. In such a case, in case the mobile station is at a sufficiently low speed of movement, the effect of noise can be reduced to possibly enhance the quality of channel estimation. Finally, the channel estimation values on the m-th mobile station $MS_m$ are to be calculated totally in the number of (the number of antenna-based pilot signals Nt)×(the number of mobile-station antennas Ns(m)).

$$h^m(j, k) = \sum_{t=1}^{Np} AP_k^*(t) r_{j,k}^{(m)}(t) \tag{1}$$

Subsequently, a received quality $P^m(j, k)$ is calculated for each antenna-based pilot signal and on each mobile-station antenna. For received quality, it is possible to apply received signal power, SIR (signal power to interference power ratio), SNR (signal power to noise power ratio), etc. In the below is shown an example using SNR. In the case to estimate an SNR by use of an antenna-based pilot signal $AP_k(t)$, signal power is taken as $S^m(j, k) = |h^m(j, k)|^2/Np$. Received quality Pm(j, k), i.e. SNR $(=S^m(j, k)/N^m(j, k))$ can be evaluated by use of the noise power $N^m(j, k)$ shown in (Equation 2).

$$N^m(j, k) = \frac{1}{Np} \sum_{t=1}^{Np} |r_{j,k}^{(m)}(t) - S^m(j, k)|^2 \tag{2}$$

The above corresponds to the operation at steps S321 and S322.

Then, the mobile station $MS_m$ feeds the calculated channel estimation value $h^m(j, k)$ and received quality $P^m(j, k)$ back to the base station 1 through a communication channel (step S323). Incidentally, as for received quality, it is possible to feed an average of Ps (m) shown in (Equation 3) taken over the number of base-station antennas Nt and the number of mobile-station antennas Ns (m) back to the base station 1 through the communication channel in order to diminish the feedback information, instead of feeding back all of (the number of antenna-based pilot signals Nt)×(the number of mobile station antennas Ns (m)). The below explains a scheme to convey Ps(m) as a received quality. Incidentally, although average value is calculated here over the received qualities Pm(j, k) as shown in (Equation 3), median or maximum value may be employed. In order to further diminish the amount of feedback information, the base station and the mobile station may share a table whose channel estimation values $h^m(j, k)$ and received qualities $P^m(j, k)$ are quantized at a predetermined interval, to thereby exchange its table number.

$$P_s(m) = \frac{1}{N_t N_s(m)} \sum_{k=1}^{Nt} \sum_{j=1}^{Ns(m)} P^m(j, k) \tag{3}$$

Meanwhile, in the base station 1, it is checked whether or not the space-division-multiplex-transmission evaluation criterion calculating means 201 and space-division-multiple-access evaluation criterion calculating means 202 received feedback information about a channel estimation value $h^m(j, k)$ and received quality information Ps(m) 213 (step S302). When received, the deciding means 203 decides a preferentially-allocated mobile station depending upon an output result calculated from them (step S303). The scheduling method for preferentially allocating a mobile station includes a maximum CIR method, a proportional fairness method and the like that are packet scheduling based on SIR, which are disclosed of information in Document A. Jalali et al, "Data Throughput of CDMA-HDR a High Efficiency-High Data Rate Personal Communication Wireless System," IEEE VTC2000-Spring, pp. 1854-1858. It is assumed here that the A-th mobile station $MS_A$ is preferentially allocated to commence mobile-station-based (user-based) communication.

Then, the deciding means 203 of the base station 1 decides whether or not SDM transmission is available with the preferentially-allocated mobile station MSA depending upon an evaluation value calculated by the space-division-multiplex-transmission evaluation criterion calculating means 201 (step S304). In case it is an SDM-uncompatible mobile station 3, the deciding means 203 searches for a mobile station to which SDMA is available (step S306).

Meanwhile, in case it is an SDMA-compatible mobile station 2, an SDM-compatible process is made (step S305) by using the fed back propagation-path channel estimation value $h^A(j, k)$. Subsequently, searched for is a mobile station with which SDMA is available (step S306). Note that k=1, ..., Nt while j=1, ..., Ns(A). It is assumed that space-division-multiplex channels are used in the number of Nc as a result of decision. Note that it is a natural number satisfying 1≦Nc<Ns (A). Here, in the SDM-compatible process, the channel estimation values $h^A(j, k)$ concerning the mobile station MSA can be expressed as a matrix as in (Equation 4), to calculate singular values λj in the number of Ns(A) obtainable by singular value resolution of H(A) whereby the number of space division multiplex channels can be decided due to the number of the singular values exceeding a predetermined value. Here, j=1, ..., Ns(A). Meanwhile, calculation can be made, as another method, for correlation coefficients at between row vectors in the number of (Ns(A)-1) of H(A) (hereinafter, spatial correlation coefficients), to take a number assuming equal to or smaller than a predetermined value as the number of space division multiplex channels.

$$H(A) = \begin{bmatrix} h^A(1,1) & h^A(1,2) & \ldots & h^A(1, N_t) \\ h^A(2,1) & h^A(2,2) & \ldots & h^A(2, N_t) \\ \vdots & \vdots & \vdots & \vdots \\ h^A(N_s(A), 1) & h^A(N_s(A), 2) & \ldots & h^A(N_s(A), N_t) \end{bmatrix} \quad (4)$$

Meanwhile, searching for an SDMA-available mobile station SDMA (step S306) is based on a channel estimation value or received quality information fed back to the base station 1. At first, by using the received quality information Ps(m) except for the received quality information Ps(A) about the A-th mobile station $MS_A$, a mobile station having a quality exceeding a predetermined level is selected in the first stage. As predetermined level setting, setting may be as Ps(m)>Ps(A)+C using a predetermined margin value C (where m represents a mobile station number within the communication area 5, except for A).

In this case, selection is possible for a mobile station higher in received quality than the A-th mobile station $MS_A$. In the case of effecting a transmission power control to the base station 1, the transmission power from the base station 1 can be set lower than the A-th mobile station $MS_A$, thus enabling to reduce the interference with the mobile station $MS_A$.

Then, calculated is a spatial correlation coefficient SC(m, A) between the channel estimation value $h^A(j, k)$ on the already allocated mobile station MSA and the channel estimation value $h^m(j, k)$ among the mobile stations selected in the first stage, by use of (Equation 5) or (Equation 6). Here, * represents a complex conjugate. Here, m represents a number of the mobile station selected in the first stage.

$$SC(m, A) = \frac{1}{N_s(m)N_s(A)N_t} \sum_{j_A=1}^{N_s(A)} \sum_{j_m=1}^{N_s(m)} \sum_{k=1}^{N_t} \frac{[h^m(j_m, k)]^* h^A(j_A, k)}{\sqrt{h^m(j_m, k)} \sqrt{h^A(j_A, k)}} \quad (5)$$

$$SC(m, A) = \max_{j_A \in N_s(A), j_m \in N_s(m)} \frac{1}{N_t} \sum_{k=1}^{N_t} \frac{[h^m(j_m, k)]^* h^A(j_A, k)}{\sqrt{h^m(j_m, k)} \sqrt{h^A(j_A, k)}} \quad (6)$$

For all the subjects of mobile stations $MS_m$ selected in the first stage, spatial correlation coefficient operation is made in the space-division-multiple-access evaluation criterion calculating means 202 according to (Equation 5) or (Equation 6), to decide whether or not the mobile station $MS_m$ lowest in spatial coefficient SC(m, A) relative to the A-th mobile station $MS_A$ is below a predetermined spatial correlation coefficient (step S307). When below, it is selected as a space-division-multiple-access mobile station (assumably taken as a B-th mobile station) and furthermore it is determined whether the space-division-multiple-access mobile station is an SDM-compatible mobile station 2 or not (step S308). In case it is an SDM-uncompatible mobile station 3, search is made again for a mobile station $MS_m$ SDMA is available (step S306). In case it is an SDM-compatible mobile station 2, SDM-compatible process is made using the similar method to the step S305 by use of a channel estimation value $h^B(j, k)$ over a propagation path feedback has been made (step S309). Note that k=1,...,Nt while j=1,...,Ns(B). It is assumed that space division multiplex channels in the number of $Nc^{(B)}$ are assumably used as a result of decision. However, it is a natural number satisfying $1<Nc^{(B)}<Ns^{(B)}$. After the decision, search is made again for a mobile station $MS_m$ SDMA is available (step S306).

Incidentally, when searching for a mobile station $MS_m$ SDMA is available in the case a plurality of mobile stations $MS_m$ have been allocated in the step S306, MSC(m) shown in (Equation 7) is used in place of SC(m, A). MSC(m) provides the maximum SC(m, k) for the already allocated mobiles stations A, B, C, . . . . However, k provides a number of the already allocated mobile station $MS_A$, $MS_B$, $MS_C$, . . . .

$$MSC(m) = \max_{k=A,B,C,\ldots} SC(m, k) \quad (7)$$

Then, in the case of a determination at step S307 that there are no mobile stations $MS_m$ SDMA is available, a communication start notification including a notification (notifying the number of space division multiplex ones) as to whether to carry out an SDM, to the allocated predetermined mobile station $MS_m$ without effecting space division multiple accesses furthermore (step S310).

Then, the base station starts an individual-user channel transmission to the mobile station $MS_m$ (step S311). Meanwhile, a predetermined mobile station $MS_m$, when receiving the communication start notification from the base station 1, makes a process for individual-user channel reception (step S324) and starts to receive the signals thereafter sent through the individual user channel (step S325). Incidentally, the transmission power to the mobile stations $MS_m$ allocated for SDMA are placed under transmission power control to obtain a predetermined received quality.

Incidentally, in the case of carrying out an SDMA at between the SDM-compatible mobile station 2 and the SDM-uncompatible mobile station 3, the SDM-uncompatible mobile station 3 cannot be suppressed against interference in the space domain. Consequently, by setting a target received quality higher to the SDM-uncompatible mobile station 3 than the SDM-compatible mobile station 2, received quality in SDMA can be assured.

As in the above, even where there are SDM-compatible mobile stations 2 and SDM-uncompatible mobile stations 3 within the communication area 5, the mobile station MSm feeds a channel estimation value and received quality information back to the base station 1 by use of an antenna-based pilot signal whereby the base station 1 is allowed to select a mobile station $MS_m$ where multiplexing is available using a space domain combined with both simultaneously or anyone of SDA and SDMA, thus enabling to efficiently utilize space division multiplex.

Now explanation is made on the directivity control operation at the mobile station MS and base station BS after completing the communication allocation process.

The transmission data sequence is assumably $S_k^n(t)$ (where t represents a time) which is on the k-th space division multiplex channel to the n-th mobile station $MS_n$. Here, n is a natural number equal to or smaller than the number of mobile stations Nd to which space division multiple access is to be made while k is a natural number equal to or smaller than the number of space division multiplex ones $Nc^{(n)}$ to the n-th mobile station $MS_n$. Meanwhile, $1 \leq Nc^{(n)} < Ns^{(1)}$. The channel estimation value is assumed h''(p, m) which is received at the p-th antenna of the n-th mobile station $MS_n$. The channel estimation value h''(p, m) is for the antenna-based pilot signal $AP_m(t)$ of from the m-th base-station antenna fed back from the mobile station $MS_n$ to the base station BS. Incidentally, m is a natural number equal to or smaller than the number of base-station antennas Nt while p is a natural number equal to or smaller than the number of antennas $Ns^{(n)}$ on the n-th mobile station $MS_n$. Here, the channel estimation matrix $H^n$ for the n-th mobile station $MS_n$ is defined as in (Equation 8).

$$H^n = \begin{bmatrix} h^n(1,1) & h^n(1,2) & \ldots & h^n(1,N_t) \\ h^n(2,1) & h^n(2,2) & \ldots & h^n(2,N_t) \\ \vdots & \vdots & \vdots & \vdots \\ h^n(N_s^{(n)},1) & h^n(N_s^{(n)},2) & \ldots & h^n(N_s^{(n)},N_t) \end{bmatrix} \quad (8)$$

In FIG. 2, the weight generating means 204 generates a transmission weight by use of the channel estimation matrix $H^n$ shown in (Equation 8). Here, the transmission weight vector Wj for the j-th space division multiplex channel is to form a beam not to cause interference with the other user n, SDMA is to be made, than j-th one. n is a natural number equal to or smaller than the total number Nd of the mobile stations, SDMA is to be made, except for j-th one. Meanwhile, in the case that allocation is only to the n-th mobile station MSn wherein SDMA is not to be made, when the number of space division multiplex ones at that mobile station is $Nc^{(n)}$, antennas in the number of $Nc^{(n)}$ are selected out of the base-station antennas 208, thereby effecting transmission.

$$H^n W_j = 0, (j \neq n) \quad (9)$$

Incidentally, (Equation 9) uses an orthogonal condition under which transmission signals are free from interference between the mobile stations. Besides, usable is a weight generating method based on minimum mean square error (MMSE) as shown in (Equation 10). Here, $Y_{nj}$ is a signal component of the transmission signal to the j-th mobile station $MS_j$ to be received by the n-th mobile station $MS_n$.

$$W_j = \arg \min_W \|y_{nj} - H^n W\|^2, (j \neq n) \quad (10)$$

The beam forming section 207 duplicates the transmission data sequence $SCH^{(j)}$ of j-th space division multiplex channel by the number of the base-station antennas (Nt) by the use of transmission weight vectors $W^j = [W_{j1}, W_{j2}, \ldots, W_{jNt}]^T$ (where j is a natural number equal to or smaller than the total number Tc of the space division multiplex channels, and T represents a vector transposition) in the number equal to the total number of the space division multiplex channels Tc for use in SDM and SDMA, and multiplies thereon the elements of the transmission weight vectors, thus sending it at the base-station antenna 208.

As in the above, by generating transmission weights $W_j$ satisfying (Equation 9), reception is at a channel estimation value CA to be expressed as in (Equation 11) provided that $W_j$ is the transmission weight directed to the A-th mobile station $MS_A$ having the number of space division multiplex channels of $Nc^{(A)} = 1$. Meanwhile, where $W_j, W_{j+1}$ and $W_{j+Nc(B)-1}$ are the transmission weights directed to the B-th mobile station $MS_B$ having the number of space division multiplex channels of $Nc^{(B)} > 1$, reception is at a channel estimation matrix CB in a degree of $(Ns^{(B)} \times Nc^{(B)})$ to be expressed as (Equation 12).

In case the partial-space orthogonizing means 210 has transmission weights $W_j, W_{j+1}$ and $W_{j+NC(B)-1}$ directed to the B-th mobile station $MS_B$ having the number of space division multiplex channels of $Nc^{(B)} > 1$ where to make an SDM-transmission to the B-th mobile station $MS_B$, reception is at a channel estimation matrix $C_B$ in a degree of $(Ns^{(B)} \times Nc^{(B)})$ to be expressed as (Equation 12). Meanwhile, it previously singular-value-resolves $C_B$ as shown in (Equation 13), to select the number $Nc^{(B)}$ of singular values in the greater order of singular values obtained. By using right singular-valued matrix $Vs = [V_1, V_2, \ldots, V_{NC(B)}]$ constituted by the right singular value vectors corresponding to those singular values $\lambda_k$, the right singular-valued matrix Vs is multiplied from left on the space division multiplex channel data sequence $S(t) = [S_1^B(t) \ S_2^B(t) \ldots SN_{c(B)}^B(t)]^T$ as shown in (Equation 14), thereby calculating a signal sequence $S_2(t)$. Here, $k = 1 - Nc^{(B)}$. The beam forming section 207 multiplies the transmission weights $W_j, W_{j+1}$ and $W_{j+Nc(B)-1}$ respectively on the elements of $S_2(t)$ in the number of $Nc^{(B)}$. Here, in (Equation 13), U is a unitary matrix constituted by the left singular value vectors of the channel estimation matrix $C_B$, V is a unitary matrix constituted by the right singular value vectors of the channel estimation matrix $C_B$, and Q is a diagonal matrix having diagonal components as singular values.

Incidentally, the receiver section 222 can be configured by omitting the partial-space orthogonizing means 210. In such a case, Vs in (Equation 14) is given an Nc-degree unit matrix.

$$H^A W_j = C_A \quad (11)$$

$$H^A [W_j W_{j+1} \ldots W_{j+Nc(n)-1}] = C_B \quad (12)$$

$$C_B = U \Lambda V^H = U \begin{bmatrix} Q & 0 \\ 0 & 0 \end{bmatrix} V^H \quad (13)$$

$$S_2(t) = V_s S(t) \quad (14)$$

The above is the operational explanation as to the base station 1.

Then, in order for the SDM-compatible mobile station MSn to demultiplex-receive the space division multiplex channels in the number of $Nc^{(n)}$ and in order for the SDM-uncompatible mobile station $MS_n$ to make a reception with synchronous detection, transmuission is made by embedding a known signal sequence (hereinafter, space-division-multiplex-channel-based pilot signals) $CP_k(t)$ in each space division multiplex channel. Here, k is a natural number equal to or smaller than the total number of space division multiplex channels Tc. However, where the transmission signal is differentially coded and delayed detection is applied, there is no need to send such a space-division-multiplex-channel-based pilot signal.

Figure 5A:
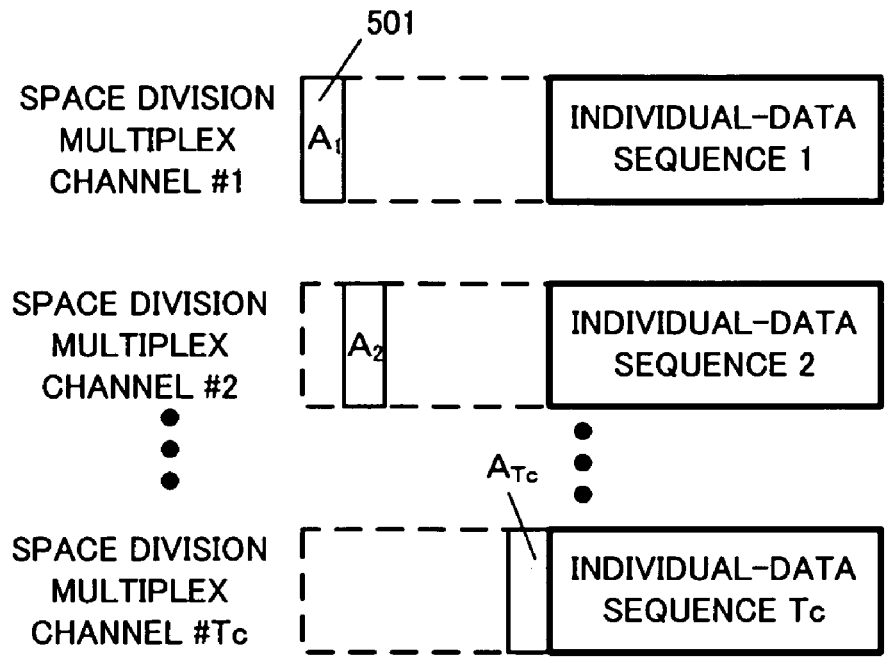
FIG. 5A is a figure showing a frame structure in time division transmission of a space-division-multiplex-channel-based pilot signal in embodiment 1 of the invention.
Figure 5B:
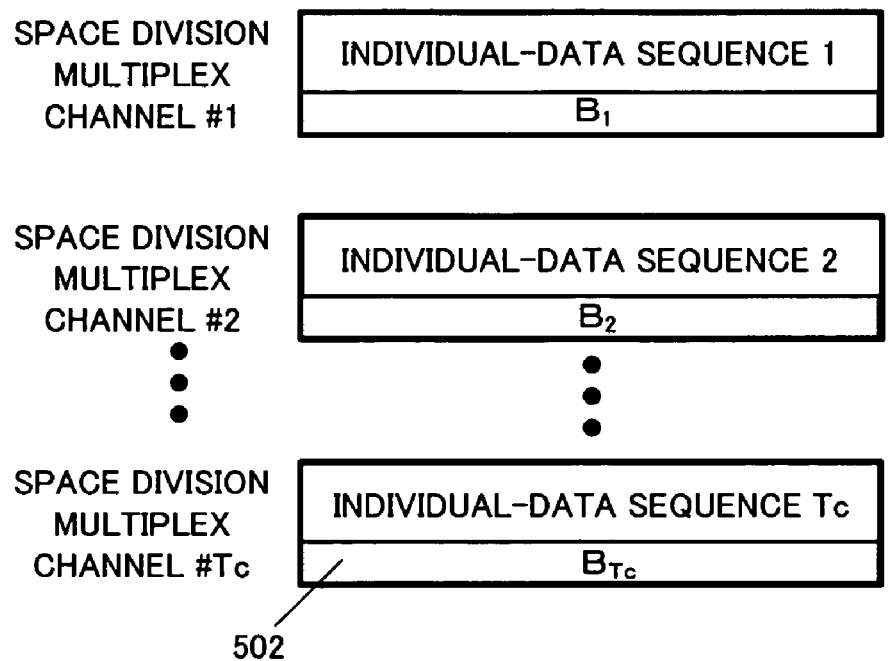
FIG. 5B is a figure showing a frame structure in code division transmission of a space-division-multiplex-channel-based pilot signal in embodiment 1 of the invention.

FIGS. 5A and 5B shows a transmission method (frame structure) of a space-division-multiplex-channel-based pilot signal $CP_k(t)$. FIG. 5A shows a method to send a space-division-multiplex-channel-based pilot signal sequence $A_k$ (501) by time division with a deviation of transmission timing. The antenna-based pilot signals use the same pattern, or mutually-orthogonal code sequences based on PN (pseudo random signals) signals, etc. FIG. 5B shows a method of sending by code division multiplex at different space division multiplex channels by the use of space-division-multiplex-channel-based pilot signal sequences $B_k$ (502) as mutually-orthogonal code sequences. Meanwhile, it is possible to use a method that time division transmission and code division transmission are combined together as explained in FIG. 4C.

Now explanation is made on the reception operation at the mobile station MS, as for the n-th SDM-compatible mobile station $MS_n$.

At first, the mobile-station antennas 221 in the number of $Ns^{(n)}$ receive a space-division-multiplexed radio-frequency signal.

The receiver section 222 in the number of $Ns^{(n)}$ output complex base-band signals $r_j^{(n)}(t)$ in the number of $Ns^{(n)}$ comprising I and Q signals by orthogonal detection after frequency conversion, for the received radio-frequency signals in the number of $Ns^{(n)}$ respectively. (Note that j is a natural number equal to or smaller than $Ns^{(m)}$) Then, the space division demultiplex means 223 demultiplexes the space division multiplex channels in the number of $Nc^{(n)}$ to the SDM-compatible mobile station $MS_n$.

In the method of demultiplexing the space division multiplex channel, it is possible to apply such techniques as 1) a method of utilizing an inverse matrix to a channel estimation matrix (zero-forcing technique), 2) maximum likelihood estimation (joint estimation), 3) V-BLAST and so on. In the below, explanation is on the operation using the method 1).

At first, by using the space-division-multiplex-channel-based pilot signal $CP_k(t)$ individually embedded in the space-division multiplex channel, channel estimation values $h^n(j,k)$ are calculated on each space-division multiplex channel as shown in (Equation 15). Here, k is a natural number equal to or smaller than the number of space division multiplex channels $Nc^{(n)}$ to be sent to the SDM-compatible mobile stations $MS_n$. Incidentally, * is a complex conjugate operator and wherein the space-division-multiplex-channel-based pilot signal $CP_k(t)$ assumably has the number of symbols $N_q$. For each space division multiplex channel obtained, a channel estimation matrix $H^n$ shown in (Equation 16) is generated having constituent elements of channel estimation values $h^n(j,k)$. By multiplying the general inverse matrix $(H^n)^{-1}$ of the same on a reception signal vector $R=[r_1^{(n)}(t), r_2^{(n)}(t), \ldots, r_{Ns(n)}^{(n)}(t)]^T$, the respective space division multiplex channels are demultiplex-received. Incidentally, concerning the number of space division multiplex ones and the kind of the space-division-multiplex-channel-based pilot signal to the mobile station $MS_n$, notification is previously made from the base station BS to the mobile station $MS_n$ by way of the control channel, etc.

$$h^n(j,k) = \sum_{t=1}^{Nq} CP_k^*(t) r_j^{(n)}(t) \quad (15)$$

$$H^n = \begin{bmatrix} h^n(1,1) & h^n(1,2) & \ldots & h^n(1, N_c^{(n)}) \\ h^n(2,1) & h^n(2,2) & \ldots & h^n(2, N_c^{(n)}) \\ \vdots & \vdots & \vdots & \vdots \\ h^n(N_s^{(n)},1) & h^n(N_s^{(n)},2) & \ldots & h^n(N_s^{(n)}, N_c^{(n)}) \end{bmatrix} \quad (16)$$

Incidentally, there is a method as another method for space division demultiplex that, when the partial space orthogonalizing means 210 is used in SDM transmission to the B-th mobile station $MS_B$, singular values are selected Nc in the greater order of those obtained in singular value resolution of $C_B$ as shown in (Equation 13). By using aright singular-valued matrix $Us=[U_1, U_2, \ldots, U_{Nc(B)}]$ constituted by left singular-value vector corresponding to those singular values, whose complex-conjugate-interposed matrix (Us)H is multiplied from left on the reception signal vector $R=[r_1^{(B)}(t), r_2^{(B)}(t), \ldots, r_{Ns(B)}^{(B)}(t)]^T$. With this method, the respective space division multiplex channels can be demultiplex-received. In this case, the right singular-valued matrix Us is previously notified to the mobile station $MS_B$ via the communication line. In the case of using this method, there is a merit of no need of sending a space-division-multiplex-channel-based pilot signal because propagation channel variation is simultaneously compensated for. Incidentally, as for the number of space division multiplex ones and the kind of the space-division-multiplexed-channel-based pilot signal to the mobile station $MS_n$, notification is previously made from the base station BS to the mobile station $MS_n$ by way of the control channel, etc.

Now explanation is made on the reception operation in the SDM-uncompatible mobile station $MS_1$.

The receiver section 222 suitably frequency-converts the radio-frequency signal received at the antenna and makes a reception operation by use of delayed detection, semi-synchronous detection or synchronous detection. The received signal is code-decided and decoded by a not-shown decoder, to restore the user-transmitted data. Incidentally, the SDM-uncompatible mobile station $MS_1$ is expected to increase in the same interference wave component because of its space division multiple access. In order to remove interference, by mounting a multi-path interference canceler described in the document, etc. disclosed in Electronic Information Society technical Report RCS2000-134(2000) by Higuchi et al., the same interference component can be removed. The post-removal received signal is code-decided and decoded by the decoder section, to restore the user-transmitted data thereby obtaining high-quality reception performance.

As discussed above, in the present embodiment, the base station BS makes an allocation of the mobile stations for transmission through a combination of SDM and SDMA while the mobile station implements a transmission-directivity control method and an in-mobile-station space division demultiplex receiving method. This allows the base station to make a space division multiple access to another mobile station in accordance with a propagation environment, together with space division multiplex transmission to a particular mobile station. This makes it possible to efficiently utilize the spatial freedom at the base station, to effectively make use of the space division multiplex technique and user-diversity effect based on SDM or SDMA, and to improve the communication capacity of a radio communication system.

Incidentally, the present embodiment can be applied similarly to a radio communication system of a multi-carrier transmission scheme. In this case, there is available 1) a method of making a similar operation to embodiment 1 by use of one of a plurality of sub-carriers (e.g. a sub-carriers at around a center frequency, etc.) and forming one transmission beam common to the sub-carriers, and 2) a method of making a similar operation to embodiment 1, i.e. channel estimation value calculation and received quality estimation on a sub-carrier-by-sub-carrier basis, to feed those pieces of information back to the base station 1 thereby allocating mobile stations $MS_m$ for effecting SDM and SDMA depending upon a calculated spatial correlation coefficient. Incidentally, during calculating a spatial correlation coefficient, a spatial correlation coefficient is calculated on each sub-carrier similarly to embodiment 1, to allocate mobile stations $MS_m$ by taking, as the final spatial correlation coefficient, a representative value such as an average or median thereof, a maximum value and a minimum value. Meanwhile, by a transmission-beam forming method for forming a transmission beam on each sub-carrier, the present embodiment can be applied similarly.

Incidentally, in the present embodiment it is possible to change adaptively the allocation process of mobile stations $MS_m$ in accordance with the traffic status of SDM or SDMA. Where a number of mobile stations $MS_m$ exist within the communication area 5 and call loss occurs more frequently than a predetermined level, the process to omit the SDM-compatible process (step S305, S309) in FIG. 3 can give priority to the mobile-station allocation that SDMA is available rather than SDM. This can obtain an effect that can increase the number of mobile stations that communications are possible at the same time.

Meanwhile, the allocation process of mobile stations $MS_m$ can be adaptively changed in accordance with the magnitude of communication area 5 (or cell radius). In this case, in the case that generally the base-station antenna has a height greater than the surrounding buildings as in the macro-cell, there is a comparative increase in the percentage of the region where the sight in transmission and reception can be secured within the communicating area 5. Hence, it becomes under the environment of communications suited for SDMA rather than SDM. For this reason, priority is given to the mobile-station allocation for SDMA rather than that for SDM by the process to omit the SDM-compatible process (step S305, S309) in FIG. 3.

Incidentally, although this embodiment explained the communication method using space division multiplex in the transmission of from the base station 1 to the mobile station $MS_m$ (downlink), it can be similarly applied to the transmission of from the mobile station $MS_m$ to the base station 1 (uplink). In this case, antenna-based pilot signals are sent to the base station 1 by time or code division based on each antenna provided on the mobile station $MS_m$ so that a channel estimation value and received quality can be calculated on each antenna-based pilot signal in the base station 1. This allows SDM or SDMA allocation to the mobile stations $MS_m$ by the similar operation to the explanation with FIG. 3, without using the feedback information from the mobile stations $MS_m$.

Incidentally, in the present embodiment, the channel estimation value and received quality information in the transmission of from the base station 1 to the mobile station $MS_m$ (downlink) is fed back to the base station 1 through the communication line. Because the radio communication system using TDD (time division duplex) uses the same frequency as transmission medium, antenna-based pilot signals are sent by time or code division to the base station 1 on each of the antennas provided on the mobile stations $MS_m$. In the base station 1, channel estimation values and received qualities are calculated on the respective antenna-based pilot signals. This allows SDM or SDMA allocation to the mobile stations $MS_m$ by the similar operation to the communication allocation process explained with FIG. 3, without using the feedback information from the mobile stations $MS_m$. Meanwhile, the present embodiment can be applied similarly to a TDD uplink.

Incidentally, the evaluation values related to the mobility of mobile-stations $MS_m$, such as estimated roaming velocity of the mobile station $MS_m$ and Doppler-frequency estimation value, may be combined as received quality information, besides the received quality such as SNR explained in the present embodiment. In this case, although delay occurs due to received quality information feedback or SDMA or SDMA allocation process, operation is made available by adding the step S306 in FIG. 3 with a decision operation that SDMA or SDM allocation process is not made to the mobility stations higher than a predetermined mobility.

Embodiment 2

Figure 6:
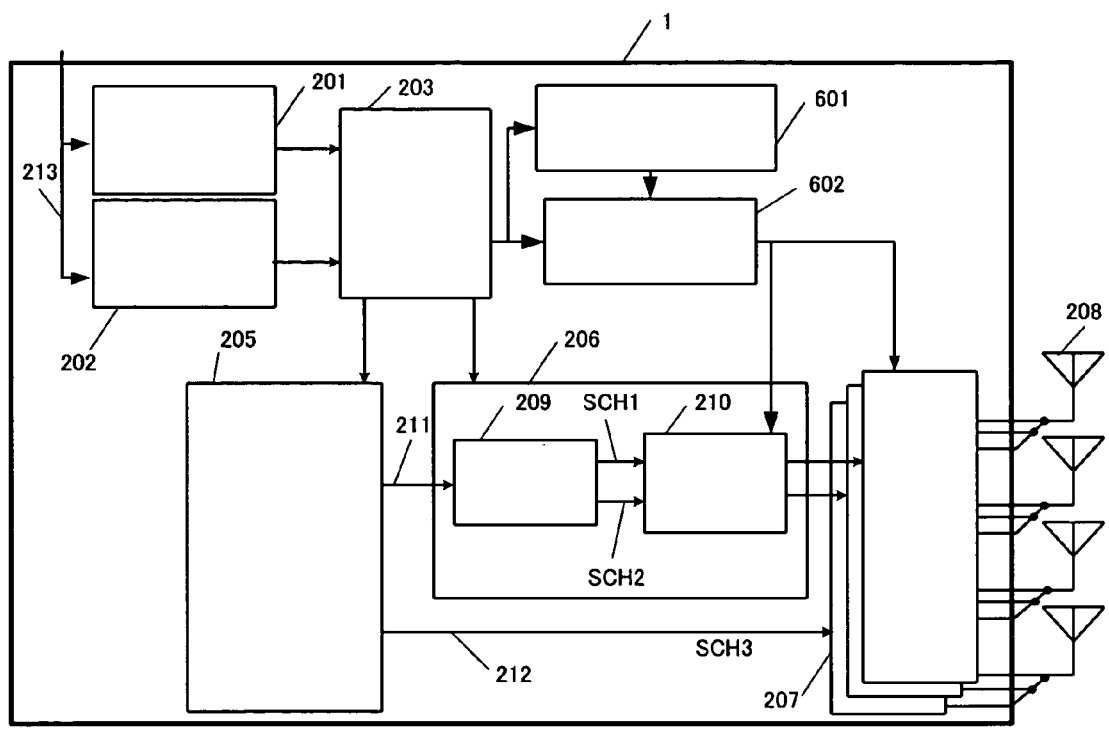
FIG. 6 is a figure showing a configuration of a base station in embodiment 2 of the invention.

FIG. 6 is a diagram showing a configuration of a base station apparatus according to embodiment 2 of the invention. This embodiment explained a spatial-channel forming method for communication, with priority, with the SDM-uncompatible mobile station, in a radio communication system where SDM-compatible mobile stations and SDM-uncompatible mobile stations coexist within the area.

The base station BS shown in FIG. 6 is different in configuration in that there are provided SDM-uncompatible-mobile-station weight generating means 601 and SDM-compatible-mobile-station weight generating means in place of the weight generating means 204 in FIG. 2 used in embodiment 1, thereby being different in the method to generate a transmission beam. Explanation is made below mainly on the different part from embodiment 2, to omit the explanation as to the part similar to embodiment 1. Incidentally, the explanation is on a directivity control method in the mobile station MS and base station BS of after communication allocation process to the mobile stations MS by use of space division multiplex in the downlink.

The transmission data sequence is assumed $S_k^n(t)$ (where t represents a time) which is for the k-th space division multiplex channel to the n-th mobile station $MS_n$. Here, n is a natural number equal to or smaller than the number of mobile stations Nd to which space division multiple access is to be made while k is a natural number equal to or smaller than the number of space division multiplex ones $Nc^{(n)}$ to the mobile stations $MS_n$. Meanwhile, $1 \leq Nc^{(n)} < Ns^{(1)}$. The channel estimation value is assumed $h^n(p, m)$ which is in the case of reception at the p-th antenna on the n-th mobile station $MS_n$. This channel estimation value $h^n(p, m)$ is for the antenna-based pilot signal $AP_m(t)$ of from the base-station antenna 208 fed back from the mobile station $MS_n$ to the base station BS. Incidentally, m is a natural number equal to or smaller than the number of base station antennas Nt while p is a natural number equal to or smaller than the number of antennas $Ns^{(n)}$ at the n-th mobile station $MS_n$. Here, the channel estimation matrix $H^n$ for the n-th mobile station $Ms_n$ is defined as in (Equation 8).

SDM-uncompatible-mobile station weight generating means 601 generates a transmission weight vector $Ws = (H^{(s)})^H$ for the s-th SDM-uncompatible mobile station $MS_n$ and outputs it to SDM-compatible mobile station weight generating means 602. Note that $^H$ represents complex conjugate transposition. Due to the transmission weight vector Ws, the s-th SDM-uncompatible mobile station $MS_s$ obtains a received signal that combined in the maximal ratio are a plurality of transmission signals from a plurality of antennas of the base station BS.

The SDM-compatible-mobile station weight generating means 602 generates a beam that the transmission weight vector Wj for the j-th space division multiplex channel to the SDM-compatible mobile station MSj does not cause interference with the other users n, SDMA is to be made, than the j-th one, as in (Equation 9). n is a natural number equal to or smaller than the total number of mobile stations Nd to which SDMA is to be made. Due to this, in the case the transmission weight is $W_j$ which is directed to the A-th mobile station $MS_A$ having the number of space division multiplex channels of $NC^{(A)}=1$, reception is at a channel estimation value $C^A$ to be expressed as (Equation 10). Meanwhile, where the transmission weight is $W_j, W_j+1, W_{j+Nc(B)-1}$ which is directed to the B-th mobile station $MS_B$ having the number of space division multiplex channels of $NC^{(B)}>1$, reception is at a channel estimation value $C_B$ in the degree of $(Ns^{(B)} \times Nc^{(B)})$ to be expressed as (Equation 12). Here, in case the partial-space orthogonizing means 210 has transmission weights $W_j, W_{j+1}$ and $W_{j+Nc(B)-1}$ directed to the B-th mobile station $MS_B$ having the number of space division multiplex channels of $NC^{(B)}>1$ where to make an SDM-transmission to the mobile station $MS_B$, reception is at a channel estimation value $C_B$ in the degree of $(Ns^{(B)} \times Nc^{(B)})$ to be expressed as (Equation 12). $C_B$ is previously resolved into singular values as shown in (Equation 13), to select the number $Nc^{(B)}$ of singular values in the greater order of those obtained. By use of a right singular-valued matrix $Vs=[V_1, V_2, \ldots, V_{Nc(B)}]$ constituted by right singular values corresponding to those singular values $\lambda_k$, the right singular-valued matrix Vs is multiplied from left on the data sequence $S(t)=[S_1^B(t)\ S_2^B(t)\ \ldots\ S_{Nc(B)}^B(t)]^T$ of space division multiplex channel as shown in (Equation 14), to calculate a signal sequence $S_2(t)$. Here, $k=1-Nc^{(B)}$.

Then, the beam forming section 207 multiples the transmission weights $W_j$, $W_{j+1}$ and $W_{j+Nc(B)-1}$ respectively on the elements of $S_2(t)$ in the number of $Nc^{(B)}$. Here, in (Equation 13), U is a unitary matrix constituted by the left singular value vectors of the channel estimation matrix $C_B$, V is a unitary matrix constituted by the right singular value vectors of the channel estimation matrix $C_B$, and Q is a diagonal matrix having diagonal components as singular values. Incidentally, the partial-space orthogonizing means 210 can be structurally omitted, in which case Vs in (Equation 14) is given as Nc-degree unit matrix.

The operation in the mobile station $MS_n$ is similar to embodiment 1.

As discussed above, explanation was made on the radio communication system using a method of forming a beam to SDM-uncompatible mobile stations different from embodiment 1, as to the case of transmission through a combination of SDM and SDMA at the base station BS. Due to the present embodiment, the base station uses, for the SDM-uncompatible mobile stations, a transmission beam from which can be obtained a received signal combined in the maximum ratio of a plurality of transmission signals of from a plurality of antennas. This enables SDMA in the state the received quality to the SDM-uncompatible mobile stations is sectured at a certain level. Meanwhile, although there is an increasing interference with the SDM-compatible mobile stations, the SDM-compatible mobile station can remove the interference by use of a space domain due to a plurality of antennas provided thereon, thus being higher in immunity to interference than the SDM-uncompatible mobile station. Due to this, the radio communication system can put the decrease of throughput to a small range.

Incidentally, the present embodiment can be applied similarly to a multi-carrier-schemed radio communication system. In this case, there is available 1) a method of making a similar operation to embodiment 1 by use of one of a plurality of sub-carriers (e.g. a sub-carrier at around a center frequency, etc.) and forming one transmission beam common to the sub-carriers, and 2) a transmission beam forming method of making a similar operation to embodiment 1 by use of a part or all of a plurality of sub-carriers and forming transmission beams on a sub-carrier-by-sub-carrier basis based on channel estimation values for the antenna-based pilot signals of the respective sub-carriers.

Embodiment 3

Figure 7:
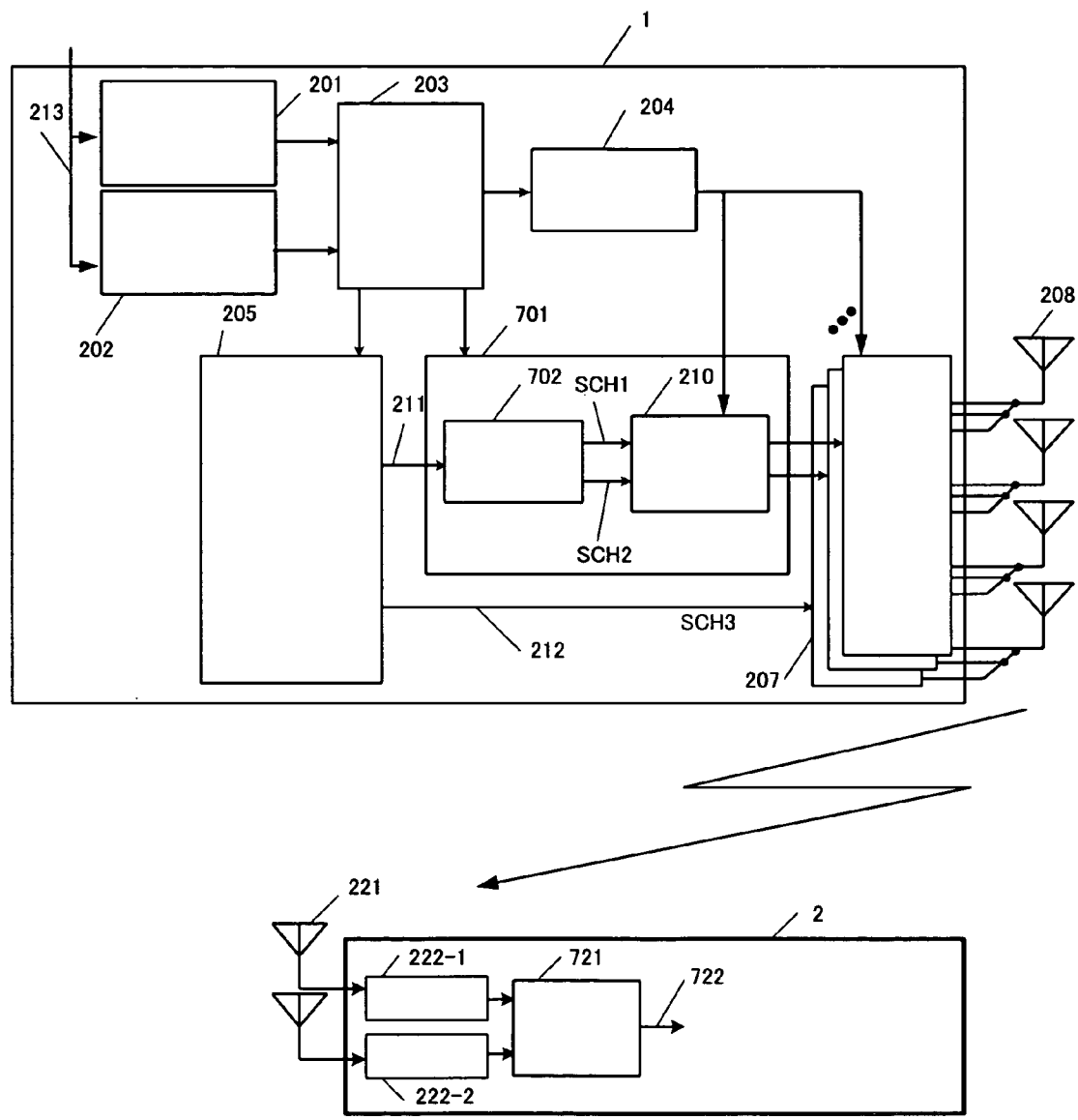
FIG. 7 is a figure showing a configuration of a base station and mobile station in embodiment 3 of the invention.

FIG. 7 is a diagram showing a configuration of a base station apparatus according to embodiment 3 of the invention. This embodiment is different from embodiment 1 in that space division multiplex transmission control means 701 has space-time coding means 702 for making a space-time-coding at between the channels for space division multiplex transmission.

Explanation is made mainly on the part of the space division multiplex control means 701 different from embodiment 1. Meanwhile, the explanation is made, using FIG. 7, on a directivity control method in the mobile station MS and base station BS of after communication allocation process to the mobile stations MS by use of space division multiplex in the downlink, similarly to embodiment 1.

The transmission data sequence is assumed $S_k^n(t)$ (where t represents a time) which is on the k-th space division multiplex channel to the n-th mobile station $MS_n$. Here, n is a natural number equal to or smaller than the number of mobile stations Nd to which space division multiple access is to be made while k is a natural number equal to or smaller than the number of space division multiplex ones $Nc^{(n)}$ to the mobile stations $MS_n$. Meanwhile, $1 \leq Nc^{(n)} < Ns^{(1)}$. The channel estimation value is assumed $h^n(p, m)$ which is in the case of reception at the p-th antenna on the n-th mobile station $MS_n$. This channel estimation value $h^n(p, m)$ is for the antenna-based pilot signal $AP_m(t)$ of from the base-station antenna 208 fed back from the mobile station $MS_n$ to the base station BS. Incidentally, m is a natural number equal to or smaller than the number of base station antennas Nt while p is a natural number equal to or smaller than the number of antennas $Ns^{(n)}$ at the n-th mobile station $MS_n$. Here, the channel estimation matrix $H^n$ for the n-th mobile station $Ms_n$ is defined as in (Equation 8).

The space-time coding means 702 outputs a space-division-multiplex-channel data sequence $S(t)=[S_1^B(t)\ S_2^B(t)\ \ldots\ S_{Nc(B)}^{B(t)}]^T$ which space-time coding process is made on a transmission data sequence 211 to mobile station MS1, to which space division multiplex is to be made, of after being processed by a not shown predetermined error-correction coding process, interleave process and symbol-mapping process onto a modulation-phase plane. Concerning space-time coding and a decoding method thereof, there are information-disclosed of the techniques including STBC (Space-Time Block Coding), STTC (Space-Time Trellis Coding) and ST Turbo TC (Space-Time Turbo Trellis Codes), in B. Vucetic, J. Yuan, "Space-Time Coding", J. Wiley & Sons Ltd (2003), which is omitted to explain here. By making a space-time coding, transmission rate lowers. However, reception-quality improvement effect can be obtained due to diversity effect.

In the case the partial-space orthogoniizing means 210 has transmission weights $W_j$, $W_{j+1}$ and $W_{j+Nc(B)-1}$ directed to the B-th mobile station $MS_B$ having the number of space division multiplex channels of $Nc^{(B)} > 1$ where to make an SDM-transmission to the B-th mobile stations $MS_B$, reception is at a channel estimation matrix $C_B$ in a degree of $(Ns^{(B)} \times Nc^{(B)})$ to be expressed as (Equation 12). It previously singular-value-resolves $C_B$ as shown in (Equation 13), to select the number $Nc^{(B)}$ of singular values in the greater order of those obtained. By using right singular-valued matrix $Vs=[V_1, V_2, \ldots, V_{Nc(B)}]$ constituted by the right singular value vectors corresponding to those singular values $\lambda_k$, the right singular-valued matrix Vs is multiplied from left on the space-division-multiplex-channel data sequence $S(t)=[S_1^B(t)\ S_2^B(t)\ \ldots\ S_{Nc(B)}^B(t)]^T$ as shown in (Equation 14), thereby calculating a signal sequence $S_2(t)$. Here, $k=1-Nc^{(B)}$.

Figure 8:
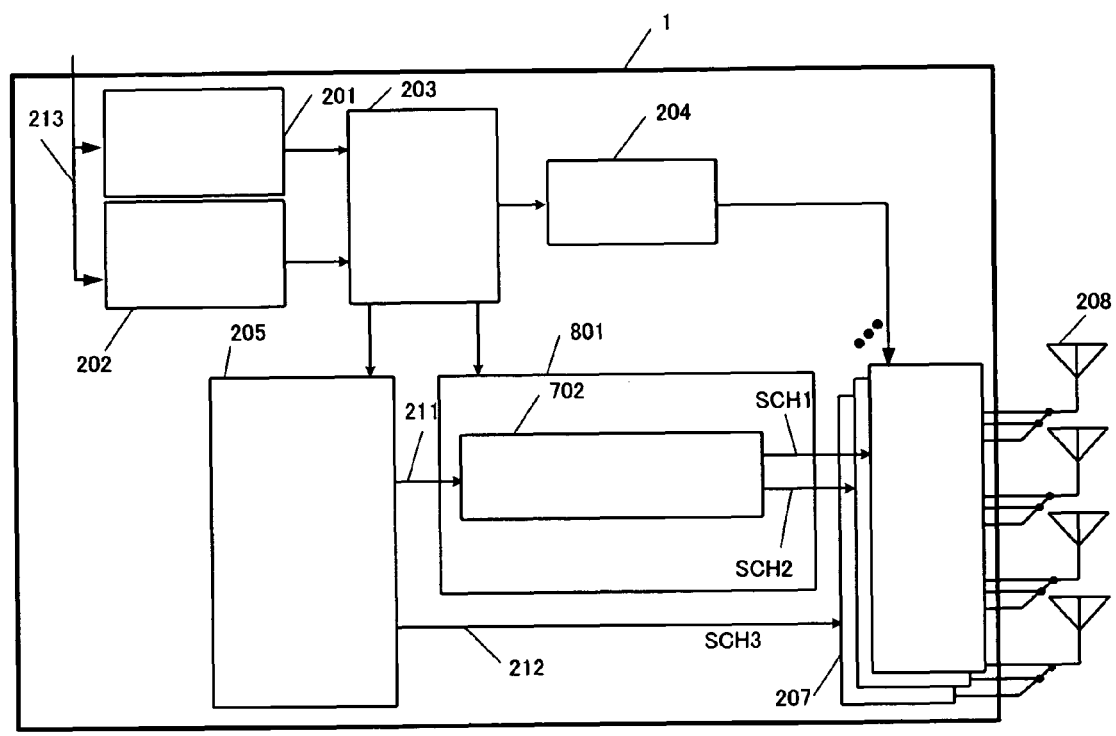
FIG. 8 is a figure showing another configuration of a base station in embodiment 3 of the invention.

Incidentally, the partial-space orthogonizing means 210 can be structurally omitted, in which case Vs in (Equation 14) is given as Nc-degree unit matrix. Accordingly, in this case, the configuration is of the space division multiplex transmission control means 801 as shown in FIG. 8.

Then, the beam forming section 207 multiples the transmission weights $W_j$, $W_{j+1}$ and $W_{j+Nc(B)-1}$ obtained by the similar operation to embodiment 1 in the weight generating means 204, on the elements of $S_2(t)$ in the number of $Nc^{(B)}$. Here, in (Equation 13), U is a unitary matrix constituted by the left singular value vectors of the channel estimation matrix $C_B$, V is a unitary matrix constituted by the right singular value vectors of the channel estimation matrix $C_B$, and Q is a diagonal matrix having diagonal components as singular values.

Meanwhile, in order for the SDM-compatible mobile station MSn to demultiplex-receive the space division multiplex channels in the number of $Nc^{(n)}$ and in order for the SDM-uncompatible mobile station MSn to make a reception with synchronous detection, transmission is made by embedding a known signal sequence (hereinafter, space-division-multiplexed-channel-based pilot signals) $CP_k(t)$ in each space division multiplex channel. Here, k is a natural number equal to or smaller than the total number Tc of space division multiplex channels. Note that, where the transmission signal is differentially coded and delayed detection is applied, there is no need of sending such a space-division-multiplex-channel-based pilot signal. Incidentally, how to send a space-division-multiplexed-channel-based pilot signal $CP_k(t)$ (frame structure) is the same as the explanation in embodiment 1 using FIG. 5.

Now explanation is made on the reception operation at the mobile station MS.

At first, the n-th SDM-compatible mobile station MSn receives a space-division-multiplexed radio-frequency signal at mobile-station antennas 221 in the number of $Ns^{(n)}$. The receiver sections 222 in the number of $Ns^{(n)}$ output the number $Ns^{(n)}$ of complex base-band signals $r_j^{(n)}(t)$ comprising I and Q signals due to post-frequency-conversion orthogonal detection, in response to the respective radio-frequency signals in the number of $Ns^{(n)}$ received. (Note that j is a natural number equal to or smaller than $Ns^{(n)}$.)

Then, space division demultiplex means 721 demultiplexes the space-division multiplex channels in the number of $Nc^{(n)}$ to the SDM-compatible mobile stations $MS_n$. The space division demultiplex means 721 calculates a channel estimation value h''(j, k) on each space division multiplex channel as shown in (Equation 15) by use of a space-division-multiplex-channel-based pilot signal CPk(t) embedded individually in the space-division multiplex channel. Furthermore, the transmission signal is decoded by use of a decode method corresponding to the space-time coding method used in the space-time coding means 702, thereby outputting a reception data sequence 722. Here, k is a natural number equal to or smaller than the number of space-division multiplex channels $Nc^{(n)}$ for transmission to the SDM-compatible mobile stations $MS_n$. Incidentally, * is a complex conjugate operator and the number of symbols in the space-division-multiplex-channel-based pilot signal $CP_k(t)$ is assumed Nq.

Incidentally, the following is included as another method of space division demultiplex. Namely, when the partial space orthogonalizing means 210 is used in SDM transmission to the B-th mobile station $MS_B$, singular values are selected Nc in the greater order of those obtained in singular value resolution of $C_B$ as shown in (Equation 13). By using a right singular-valued matrix $Us=[U_1, U_2, \ldots, U_{Nc(B)}]$ constituted by left singular-value vector corresponding to those singular values, whose complex-conjugate-interposed matrix $(US)^H$ is multiplied from left on the received signal vector $R=[r_1^{(B)}(t), r_2^{(B)}(t), \ldots, r_{Ns(B)}^{(B)}(t)]^T$. With this method, a signal can be demultiplex-received through the respective space-division multiplex channels. In this case, the right singular-valued matrix Us is previously notified to the mobile station $MS_B$ via the communication line. Incidentally, as for the number of space division multiplex ones and the kind of the space-division-multiplexed-channel-based pilot signal, notification is previously made from the base station BS to the mobile station $MS_n$ by way of the control channel, etc.

The operation to the SDM-uncompatible mobile station $MS_1$ is similar to embodiment 1.

As described above, the present embodiment is lower in transmission rate to the SDM-compatible mobile stations but can obtain a received quality improvement due to an addition of an error correction ability added with a transmission diversity effect in addition to the effect of embodiment 1, because of making a space-time coding during spatially multiplex transmission to SDM-compatible mobile stations thereby sending the same one of data by space division multiplex. This can obtain a transmission-power reduction effect where effecting transmission-power control in a manner to obtain a required received quality. Besides, where transmission power is constant, there can obtain an effect to increase the communication area where a required received quality is to be obtained.

In the present embodiment, the coding way and rate at the space-time coding means can be changed in accordance with propagation environment. This can improve the throughput in compliance with a versatility of propagation environments.

Although the present embodiment showed the example of making a space-time coding during spatially multiplex transmission to the SDM-compatible mobile stations in the downlink, similar application is available in the uplink. In this case, space-time coding is applied in the SDM-compatible mobile station to the space division multiplex transmission signal while decode process is applied in the base station in compliance with the space-time coding.

INDUSTRIAL APPLICABILITY

As described above, the present invention is useful for a radio communication system that mobile stations compatible with spatially multiplex transmission and mobile stations uncompatible therewith coexist within a communication area, and suited in effectively utilizing the spatial freedom within the base station and improving the communication capacity of the radio communication system.

The invention claimed is:

1. A base station apparatus comprising:
a deciding section for deciding an allocation for a plurality of mobile stations within a communication area, by judging:
1) whether one of the plurality of mobile stations is a space-division-multiplex (SDM) compatible mobile station by use of a predetermined SDM evaluation criterion; and
2) whether another of the plurality of mobile stations is a space-division-multiple-access (SDMA) compatible mobile station to which a SDMA transmission can be applied along with the SDM compatible mobile station by use of a predetermined SDMA evaluation criterion;
wherein the SDM evaluation criterion is calculated based on a channel estimation value and a received channel quality value received from the one of the plurality of mobile stations within the communication area;
wherein the SDMA evaluation criterion is calculated based on a received channel quality value received from the another of the plurality of mobile stations and a spatial correlation coefficient which is a measure of correlation between a channel estimation value of an already allocated SDMA mobile station of the plurality of mobile stations and a channel estimation value of the another of the plurality of mobile stations;
wherein the another of the plurality of mobile stations is judged to be a SDMA compatible mobile station when the spatial correlation coefficient is below a predetermined spatial correlation coefficient;
a partial-space orthogonalizing section for performing a weighting process, for enhancing orthogonality over a propagation path for a SDM transmission, on a first transmission data sequence to be sent by the SDM transmission to the SDM compatible mobile station;

a beam forming section for forming a plurality of transmission beams for an output of the partial-space orthogonalizing section in order to send the first transmission data sequence by the SDM transmission to the SDM compatible mobile station and a single transmission beam for a second transmission data sequence to be sent by SDMA transmission to the SDMA compatible mobile station; and a plurality of antennas for simultaneously transmitting the first transmission data sequence using the plurality of transmission beams and the second transmission data sequence using the single transmission beam, wherein, in a case that the SDM compatible mobile station and a SDM uncompatible mobile station are allocated for SDMA communication at a same time, the beam forming section forms a single maximum ratio synthetic directional transmission beam in a single space division multiplex channel to the SDM uncompatible mobile station, and forms a plurality of other directional transmission beams in a plurality of other space division multiplex channels to the SDM compatible mobile station, wherein the directional transmission beams are simultaneously transmitted to the SDM uncompatible and SDM compatible mobile stations at the same frequency.

2. The base station apparatus according to claim 1, wherein forming the transmission beam for reducing the interference by the beam forming section is to form the transmission beam from the transmission data sequence to the allocated SDMA compatible mobile station and an output of the partial-space orthogonalizing section, in a manner being orthogonal to a channel estimation matrix on another mobile station to access simultaneously.

3. A base station apparatus according to claim 2, wherein, in a case that the SDMA mobile stations include a SDM compatible mobile station and a SDM uncompatible mobile station, another transmission beam to the SDM uncompatible mobile station is formed by use of a complex-conjugate-transposition of a channel estimation matrix on the SDM uncompatible mobile station, and the transmission beam to the SDM compatible mobile station is formed in a manner being orthogonal to a channel estimation matrix on another SDMA mobile stations to access simultaneously.

4. The base station apparatus according to claim 1, wherein, forming the transmission beam for reducing the interference by the beam forming section is to form the transmission beam orthogonal to a channel estimation matrix on another of a SDM uncompatible mobile station and the SDM compatible mobile station to access simultaneously.

5. The base station apparatus according to claim 1, further comprising space-time coding means for making a space-time coding process on the transmission data sequence to the SDM compatible mobile station, the transmission data sequence space-time-coded being outputted to the partial-space orthogonalizing section.

6. A base station apparatus according to claim 1, wherein, in a case that the SDMA mobile stations include a SDM compatible mobile station and a SDM uncompatible mobile station, another transmission beam to the SDM uncompatible mobile station is formed by use of a complex-conjugate-transposition of a channel estimation matrix on the SDM uncompatible mobile station, and the transmission beam to the SDM compatible mobile station is formed in a manner being orthogonal to a channel estimation matrix on another SDMA mobile stations to access simultaneously.

* * * * *